(12) United States Patent
Sampaio et al.

(10) Patent No.: US 11,729,194 B2
(45) Date of Patent: *Aug. 15, 2023

(54) AUTOMATIC MODEL MONITORING FOR DATA STREAMS

(71) Applicant: Feedzai—Consultadoria e Inovação Tecnológica, S.A., Coimbra (PT)

(72) Inventors: Marco Oliveira Pena Sampaio, Vila Nova de Gaia (PT); Fábio Hernäni dos Santos Costa Pinto, Oporto (PT); Pedro Gustavo Santos Rodrigues Bizarro, Lisbon (PT); Pedro Cardoso Lessa e Silva, Oporto (PT); Ana Margarida Caetano Ruela, Lisbon (PT); Miguel Ramos de Araújo, Oporto (PT); Nuno Miguel Lourenço Diegues, Lisbon (PT)

(73) Assignee: Feedzai—Consultadoria e Inovação Tecnológica, S.A.

( * ) Notice: Subject to any disclaimer, the term of this patent is extended or adjusted under 35 U.S.C. 154(b) by 0 days.

This patent is subject to a terminal disclaimer.

(21) Appl. No.: 17/838,079

(22) Filed: Jun. 10, 2022

(65) Prior Publication Data

US 2022/0382861 A1     Dec. 1, 2022

Related U.S. Application Data

(63) Continuation of application No. 16/667,674, filed on Oct. 29, 2019, now Pat. No. 11,451,568.

(Continued)

(51) Int. Cl.
*H04N 21/433*     (2011.01)
*H04L 9/40*     (2022.01)
(Continued)

(52) U.S. Cl.
CPC ......... *H04L 63/1425* (2013.01); *G06F 16/22* (2019.01); *G06F 16/2474* (2019.01);
(Continued)

(58) Field of Classification Search
None
See application file for complete search history.

(56) References Cited

U.S. PATENT DOCUMENTS

| 6,381,649 B1 | 4/2002 | Carlson |
| 7,738,377 B1 | 6/2010 | Agostino |

(Continued)

OTHER PUBLICATIONS

Anderson et al., A Test of Goodness of Fit, Journal of the American Statistical Association, Dec. 1954, vol. 49, Issue 268, pp. 765-769.

(Continued)

*Primary Examiner* — Cai Y Chen
(74) *Attorney, Agent, or Firm* — Van Pelt, Yi & James LLP

(57) ABSTRACT

In an embodiment, a process for automatic model monitoring for data streams includes receiving an input dataset, using a machine learning model to determine a model score for each data record of at least a portion of the input dataset, and determining monitoring values. Each monitoring value is associated with a measure of similarity between model scores for those data records of the input dataset within a corresponding moving reference window and model scores for those data records of the input dataset within a corresponding moving target window. The process includes outputting the determined monitoring values.

19 Claims, 14 Drawing Sheets

Related U.S. Application Data

(60) Provisional application No. 62/847,101, filed on May 13, 2019.

(51) Int. Cl.

| | |
|---|---|
| *H04L 43/16* | (2022.01) |
| *H04L 41/0604* | (2022.01) |
| *G06F 16/22* | (2019.01) |
| *G06N 20/20* | (2019.01) |
| *G06N 5/04* | (2023.01) |
| *G06Q 20/40* | (2012.01) |
| *G06N 20/00* | (2019.01) |
| *G06F 16/2458* | (2019.01) |
| *G06F 21/55* | (2013.01) |
| *G06N 5/01* | (2023.01) |
| *G06F 3/0484* | (2022.01) |
| *G06F 21/62* | (2013.01) |

(52) U.S. Cl.
CPC .......... *G06F 21/554* (2013.01); *G06N 5/01* (2023.01); *G06N 5/04* (2013.01); *G06N 20/00* (2019.01); *G06N 20/20* (2019.01); *G06Q 20/4016* (2013.01); *H04L 41/0604* (2013.01); *H04L 43/16* (2013.01); *H04L 63/0428* (2013.01); *G06F 3/0484* (2013.01); *G06F 21/6245* (2013.01); *G06F 2221/034* (2013.01); *H04L 63/1416* (2013.01)

(56) References Cited

U.S. PATENT DOCUMENTS

| | | | |
|---|---|---|---|
| 8,010,296 B2 | 8/2011 | Loo | |
| 9,874,489 B1 | 1/2018 | Jerphagnon | |
| 11,181,894 B2* | 11/2021 | Cantrell | G05B 23/0235 |
| 2003/0120161 A1 | 6/2003 | Hale | |
| 2003/0191728 A1 | 10/2003 | Kulkarni | |
| 2006/0084059 A1 | 4/2006 | Yip | |
| 2006/0136410 A1 | 6/2006 | Gaussier | |
| 2007/0239285 A1 | 10/2007 | Good | |
| 2009/0310496 A1 | 12/2009 | Schuster | |
| 2010/0279622 A1 | 11/2010 | Shuman | |
| 2012/0123772 A1 | 5/2012 | Thyssen | |
| 2013/0110761 A1 | 5/2013 | Krishnamurthy | |
| 2013/0342402 A1 | 12/2013 | Pesonen | |
| 2015/0106052 A1 | 4/2015 | Balakrishnan | |
| 2015/0107334 A1 | 4/2015 | Hunter | |
| 2015/0264083 A1* | 9/2015 | Prenger | H04L 63/1425 726/23 |
| 2015/0302311 A1 | 10/2015 | Iskandar | |
| 2015/0331963 A1 | 11/2015 | Barker | |
| 2016/0088006 A1 | 3/2016 | Gupta | |
| 2017/0279838 A1 | 9/2017 | Dasgupta | |
| 2017/0314961 A1 | 11/2017 | Chen | |
| 2017/0357897 A1 | 12/2017 | Adlakha | |
| 2018/0103052 A1 | 4/2018 | Choudhury | |
| 2018/0349466 A1 | 12/2018 | Dadkhani | |
| 2018/0351981 A1 | 12/2018 | Muddu | |
| 2018/0365576 A1 | 12/2018 | Guttmann | |
| 2018/0367573 A1 | 12/2018 | Ouyang | |
| 2019/0138938 A1 | 5/2019 | Vasseur | |
| 2019/0212977 A1 | 7/2019 | Sicurelli, III | |
| 2019/0327251 A1 | 10/2019 | Muddu | |
| 2019/0342181 A1* | 11/2019 | Li | H04L 43/08 |
| 2019/0377774 A1 | 12/2019 | Joshi | |

OTHER PUBLICATIONS

Bifet et al., Learning from Time-Changing Data with Adaptive Windowing, Proceedings of the 2007 SIAM International Conference on Data Mining, 2007, pp. 443-448.

Chen et al., Incremental Quantile Estimation for Massive Tracking, Proceedings of the Sixth ACM SIGKDD International Conference on Knowledge Discovery and Data Mining, 2000, pp. 516-522.

Cortes et al., AdaNet: Adaptive Structural Learning of Artificial Neural Networks, Proceedings of the 34th International Conference on Machine Learning, 2007, vol. 70, pp. 874-883.

Dos Reis et al., Fast Unsupervised Online Drift Detection Using Incremental Kolmogorov-Smirnov Test, KDD'16, 2016.

Dunning et al., Computing Extremely Accurate Quantiles using t-Digests, Feb. 2019.

Feurer et al., Efficient and Robust Automated Machine Learning, Advances in Neural Information Processing Systems, 2015.

Frank J. Massey Jr., The Kolmogorov-Smirnov Test for Goodness of Fit, Journal of American Statistical Association, 1951, pp. 68-78.

Gama et al., A Survey on Concept Drift Adaptation, ACM Computing Surveys, Jan. 2013, vol. 1, No. 1.

Gama et al., Learning with Drift Detection, Brazilian Symposium on Artificial Intelligence, 2004.

Gama et al., On Evaluating Stream Learning Algorithms, Machine Learning, 2013, vol. 90, No. 3.

Ghanta et al., ML Health: Fitness Tracking for Production Models, 2019.

Golovin et al., Google Vizier: A Service for Black-Box Optimization, KDD'17, 2017.

H. Beyer. 1981. Tukey, John W.: Exploratory Data Analysis. Addison-Wesley Publishing Company Reading, Mass.—Menlo Park, Cal., London, Amsterdam, Don Mills, Ontario, Sydney 1977, XVI, 688 S. Biometrical Journal 23, 4 (1981), 413-414.

Hammer et al., A New Quantile Tracking Algorithm Using a Generalized Exponentially Weighted Average of Observations, Applied Intelligence, Apr. 1, 2019.

Indre Žliobaite, Change with Delayed Labeling: When is it Detectable?, 2010 IEEE International Conference on Data Mining Workshops, 2010, pp. 843-850.

Jianhua Lin, Divergence Measures Based on the Shannon Entropy, IEEE Transactions on Information Theory, Jan. 1991, pp. 145-151, vol. 37, No. 1.

Joao Gama, "On Evaluating Stream Learning Algorithms", Nov. 25, 2011.

João Gama, Knowledge Discovery from Data Streams, 2010.

Kaul et al., AutoLearn—Automated Feature Generation and Selection, 2017 IEEE International Conference on Data Mining, 2017, pp. 217-226.

Kotthoff et al., Auto-WEKA 2.0: Automatic Model Selection and Hyperparameter Optimization in WEKA, Journal of Machine Learning Research 18, 2017.

Liang et al., Evolutionary Neural AutoML for Deep Learning, 2019.

Luke Tierney, A Space-Efficient Recursive Procedure for Estimating a Quantile of an Unknown Distribution, SIAM Journal on Scientific and Statistical Computing, 1983, pp. 706-711, vol. 4, No. 4.

Luo et al., Quantiles over Data Streams: Experimental Comparisons, New Analyses, and Further Improvements, The VLDB Journal, 2016, pp. 449-472, vol. 25, No. 4.

Machine Translation of H. Beyer. 1981. Tukey, John W.: Exploratory Data Analysis. Addison-Wesley Publishing Company Reading, Mass.—Menlo Park, Cal., London, Amsterdam, Don Mills, Ontario, Sydney 1977, XVI, 688 S. Biometrical Journal 23, 4 (1981), 413-414.

Madrid et al., Towards AutoML in the Presence of Drift: First Results, Workshop AutoML, 2018.

Mann et al., On a Test of Whether One of Two Random Variables is Stochastically Larger than the Other, Annals of Mathematical Statistics, 1947.

Mendoza et al., Towards Automatically-Tuned Neural Networks, AutoML Workshop, 2016.

Nargesian et al., Learning Feature Engineering for Classification, Proceedings of the Twenty-Sixth International joint Conference on Artificial Intelligence, 2017, pp. 2529-2535.

Naumov et al., Exponentially Weighted Simultaneous Estimation of Several Quantiles, 2007.

Nicolaas Kuiper, Tests Concerning Random Points on a Circle, Nederl. Akad. Wetensch. Proc. Ser. A, 1960, vol. 63.

Pedregosa et al., Scikit-learn: Machine Learning in Python, Journal of Machine Learning Research 12, 2011, pp. 2825-2830.

(56) References Cited

OTHER PUBLICATIONS

Reshef et al., Detecting Novel Associations in Large Data Sets, Science, Dec. 16, 2011, pp. 1518-1524, vol. 334.
Sethi et al., On the Reliable Detection of Concept Drift from Streaming Unlabeled Data, 2017.
Sture Holm, A Simple Sequentially Rejective Multiple Test Procedure, Scandinavian Journal of Statistics, 1979, pp. 65-70, vol. 6, No. 2.
Sutton et al., Data Diff: Interpretable Executable Summaries of Changes in Distributions for Data Wrangling, KDD 2018, 2018, pp. 2279-2288.
Xu et al., Gradient Boosted Feature Selection, KDD'14, 2014.
Yu et al., Request-and-Reverify: Hierarchical Hypothesis Testing for Concept Drift Detection with Expensive Labels, 2018.
Huang, 2013, "Rank Based Anomaly Detection Algorithms" (Year: 2013).

\* cited by examiner

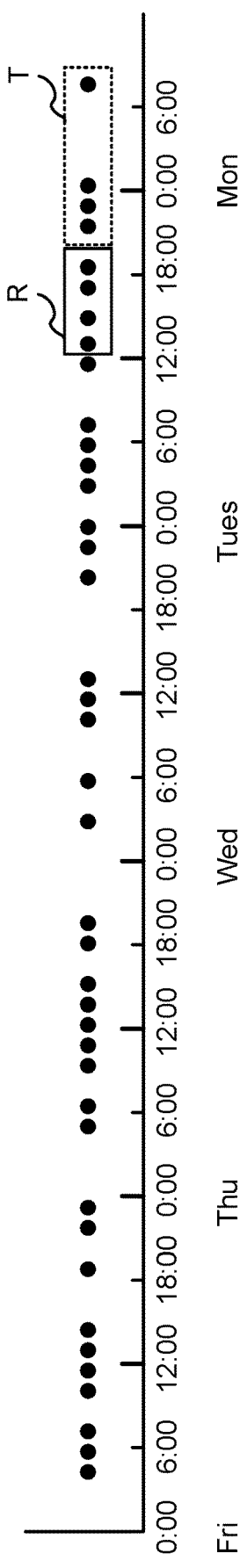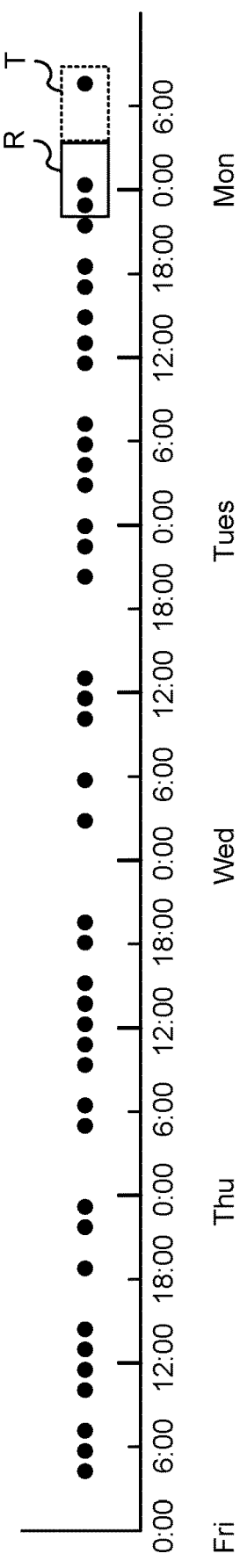

AUTOMATIC MODEL MONITORING FOR DATA STREAMS

CROSS REFERENCE TO OTHER APPLICATIONS

This application is a continuation of U.S. patent application Ser. No. 16/667,674 entitled AUTOMATIC MODEL MONITORING FOR DATA STREAMS filed Oct. 29, 2019, which claims priority to U.S. Provisional Patent Application No. 62/847,101 entitled AUTOMATIC MODEL MONITORING FOR DATA STREAMS filed May 13, 2019, both of which are incorporated herein by reference for all purposes.

BACKGROUND OF THE INVENTION

Sensitive data such as credit card numbers are increasingly being exchanged over the Internet with the evolution in point of sale systems as well as increasing popularity of online shops. Electronic security measures analyze transactional data to detect a security breach. The analysis of the transactional data includes classifying and interpreting the data. For example, a machine learning model is deployed into a data streaming scenario and the model is monitored to detect anomalous events or sudden changes in behavior.

BRIEF DESCRIPTION OF THE DRAWINGS

Various embodiments of the invention are disclosed in the following detailed description and the accompanying drawings.

FIG. 4A shows an example of fixed-size contiguous windows according to an embodiment of the present disclosure.

FIG. 4B shows an example of time-based contiguous windows according to an embodiment of the present disclosure.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 12:
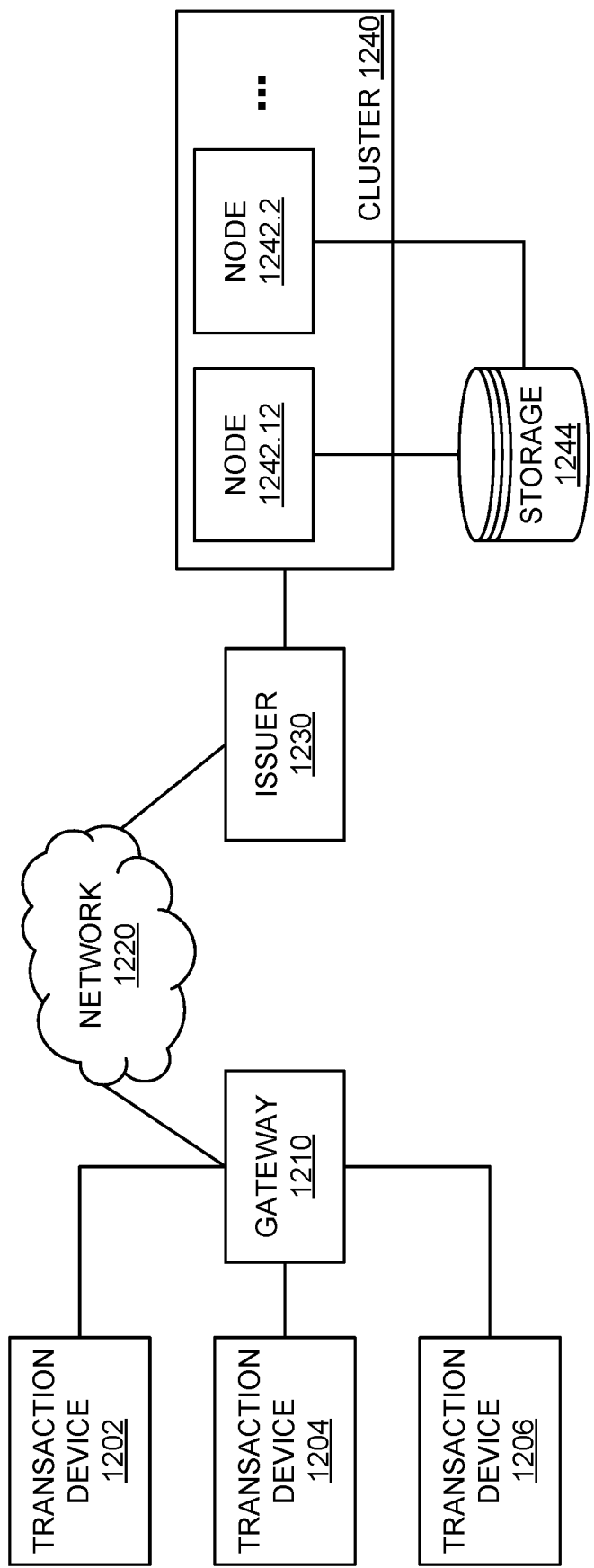
FIG. 12 is a block diagram illustrating an embodiment of a system in which automatic model monitoring for data streams can be implemented.

Model monitoring refers to monitoring machine learning models in production environments such as an environment that determines whether a fraud or security attack is happening by observing data streams of transactions. Data streams tend to change frequently and quickly in a non-stationary way. A model may misbehave because the attack pattern was not seen when the model was trained, a user does not collect certain fields expected by an API, or other engineering issues. A spike in transactions can be caused by a popular sale item, a fraud attack, or a data issue, among other things. A model may be made less strict to reduce false alarms in the case of popular sale items because these are legitimate transactions. A model may be made stricter to block more fraud attempts. To address a data issue such as an API change that makes data fields unavailable, the system platform may be updated. An example of a system for preventing fraud attacks is shown in FIG. 12. The examples here are fraud attacks but this is not intended to be limiting, and the disclosed techniques can be applied to other types of streaming data.

In an example setup, an application uses more than one machine learning model (sometimes simply called "model"), several machines with different environments, and receives data from several types of devices in different geographical locations. This relatively wide scope for unexpected behavior or sudden changes (i.e., concept drift) makes model monitoring challenging, especially if performed manually.

Concept drift is a change, over time, in the relation between the data collected to perform a classification task (to produce an interpretation of the data) and the corresponding true label collected for that data. Conventional automated methods of detecting concept drift require labels (which are often determined by an analyst) in order to accurately measure model performance. Conventional methods use the loss of the predictive model (e.g., cross entropy loss) to detect concept drift. Thus, if the labels are not immediately available after prediction, problems are detected too late. In other words, conventional methods typically cannot detect concept drift when labels are unavailable. In many domains, labels are often collected with several weeks of delay making conventional methods impractical for many streaming data applications.

In addition, conventional systems typically do not identify possible causes for concept drift. A fraud detection model in online payments could show a drift due to a popular sale item (with an increase in false positives) or due to a true fraud attack (with an increase in false negatives). Conventional model monitoring methods cannot detect or explain changes (concept drifts) before labels are available.

Automatic model monitoring for data streams is disclosed. The automatic model monitoring system detects changes in data streams (i.e., concept drift) using a time- and space-efficient unsupervised process. The disclosed model monitoring techniques can detect changes in behavior occurring in a relatively short time scale such as a few hours to a few days without needing labels. In an embodiment, a model monitoring process uses a stream of scores produced by a machine learning model to detect local changes in their distribution. An adaptive threshold is determined and applied to monitoring values calculated from the model scores to detect anomalous behavior. Monitoring values are sometimes collectively referred to as a signal here (e.g., the signal shown in FIG. 1C is made up of monitoring values). The automatic model monitoring system can explain the changes in behavior. For example, an explanation report is generated to explain the causes of the change such as a summary of events/data records and features explaining the change.

The following figures show an example of how the disclosed automatic model monitoring techniques performs a classification task. In particular, FIGS. 1A-1C show an example of a binary classification task in which anomalies are positively identified.

Figure 1A:
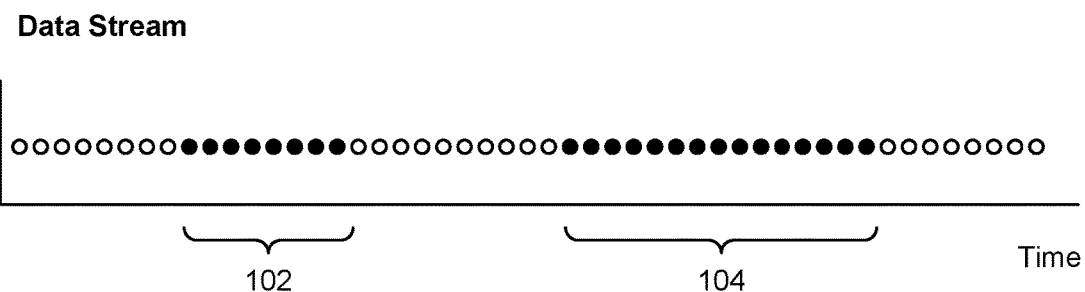
FIG. 1A shows an example of an input data stream.

FIG. 1A shows an example of an input data stream. The plot shows the data stream over time. The data stream of events/data records represented in white circles that correspond to normal behavior and the events/data records (groups 102 and 104) represented by black circles correspond to anomalous behavior. In this example, there are two bot attacks in a fraud detection scenario: a first attack at 102 and a second attack at 104.

Figure 1B:
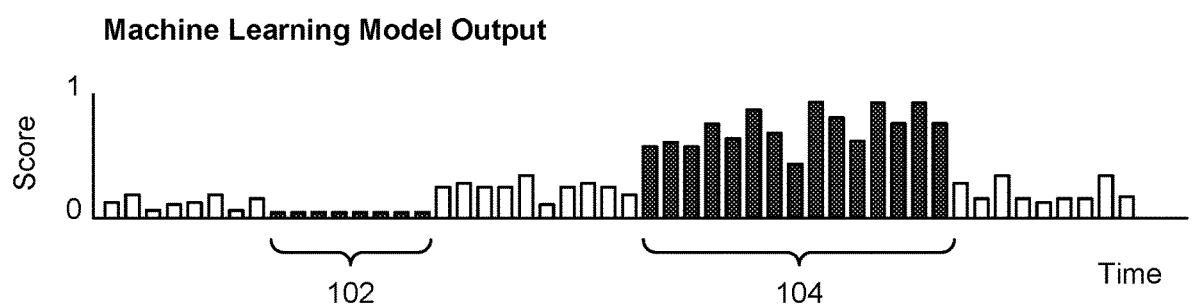
FIG. 1B shows an example of scores output by a machine learning model using the input data stream of FIG. 1A.
Figure 1C:
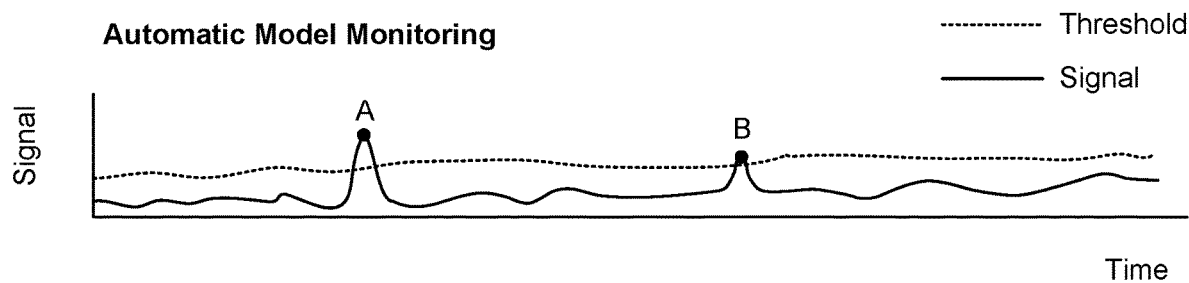
FIG. 1C shows a signal and a threshold generated by automatic model monitoring according to an embodiment of the present disclosure.

FIG. 1B shows an example of scores output by a machine learning model using the input data stream of FIG. 1A. The plot shows a time series of model scores produced by a machine learning model in response to input data of FIG. 1A. The model is not able to detect the first attack 102 because the risk scores are low. The model is able to detect the second attack 104 because the risk scores are high.

FIG. 1C shows a signal and a threshold generated by automatic model monitoring according to an embodiment of the present disclosure. The plot shows a signal (solid line) and an adaptive threshold (dashed line). The signal captures the score distribution of FIG. 1B. The signal provides a measure of similarity between the model scores distribution in a target window T (most recent events) and in a reference window R (older events). Examples of a target window and reference window are further described with respect to FIGS. 3A-3C.

The signal evolves over time as model scores corresponding to the data stream change. If the signal is larger than the threshold, an alarm is triggered as further described with respect to FIG. 2. Unlike the model in FIG. 1B, which detects an attack for scores 104 but not scores 102, the automatic model monitoring in FIG. 1C detects both attacks because the signal at A and the signal at B exceed the threshold. In various embodiments, when an alarm is triggered, a process for determining an explanation is performed as further described with respect to FIG. 9. For example, the explanation is determined by training a machine learning model to find a pattern that distinguishes events in a target window T from the events in a reference window R. The output score and the feature importance of that machine learning model is then used to summarize the characteristics of the alarm.

Figure 9:
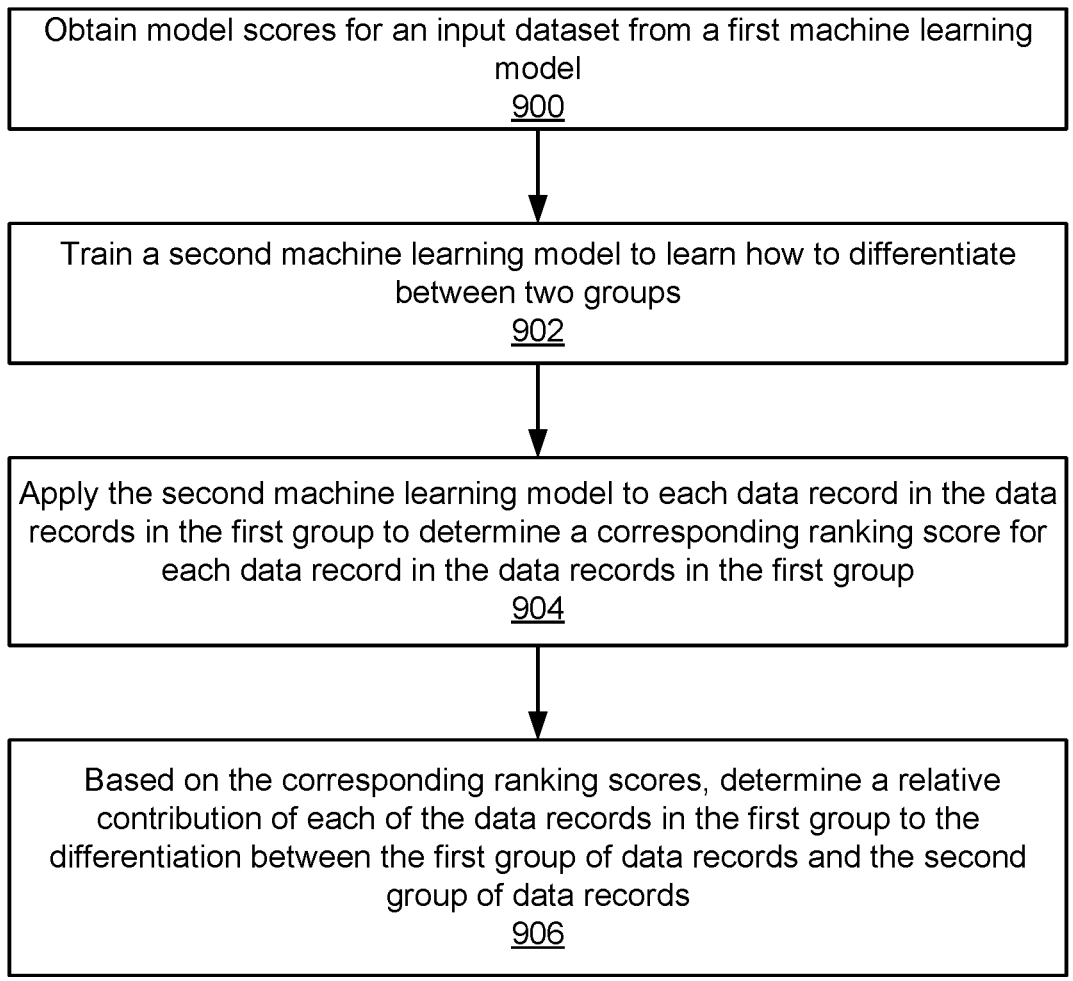
FIG. 9 is a flow chart illustrating an embodiment of a process for explanation reporting based on differentiation between items in different data groups.
Figure 10:
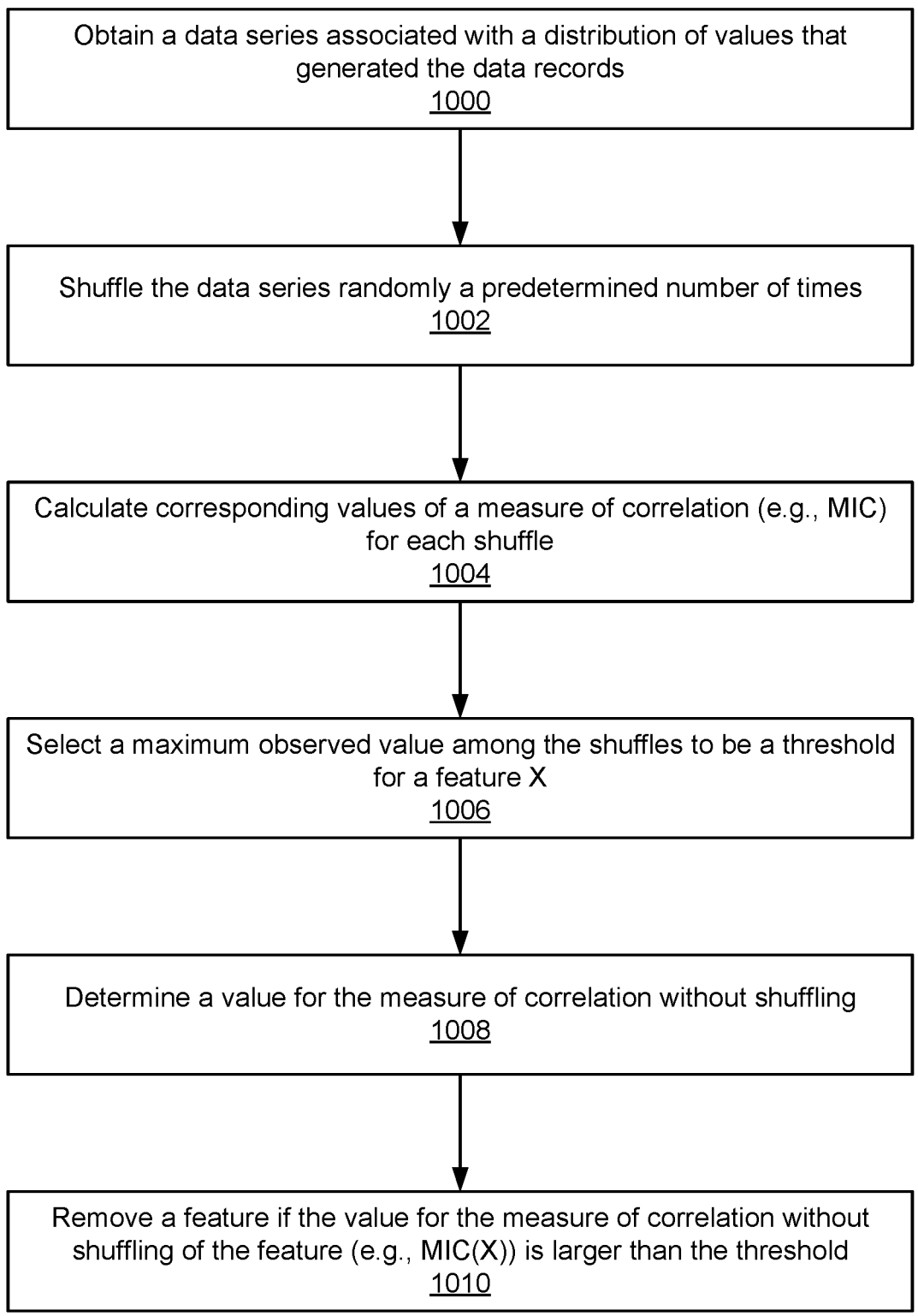
FIG. 10 is a flow chart illustrating an embodiment of a process for removing time correlated features in a data set.
Figure 11:
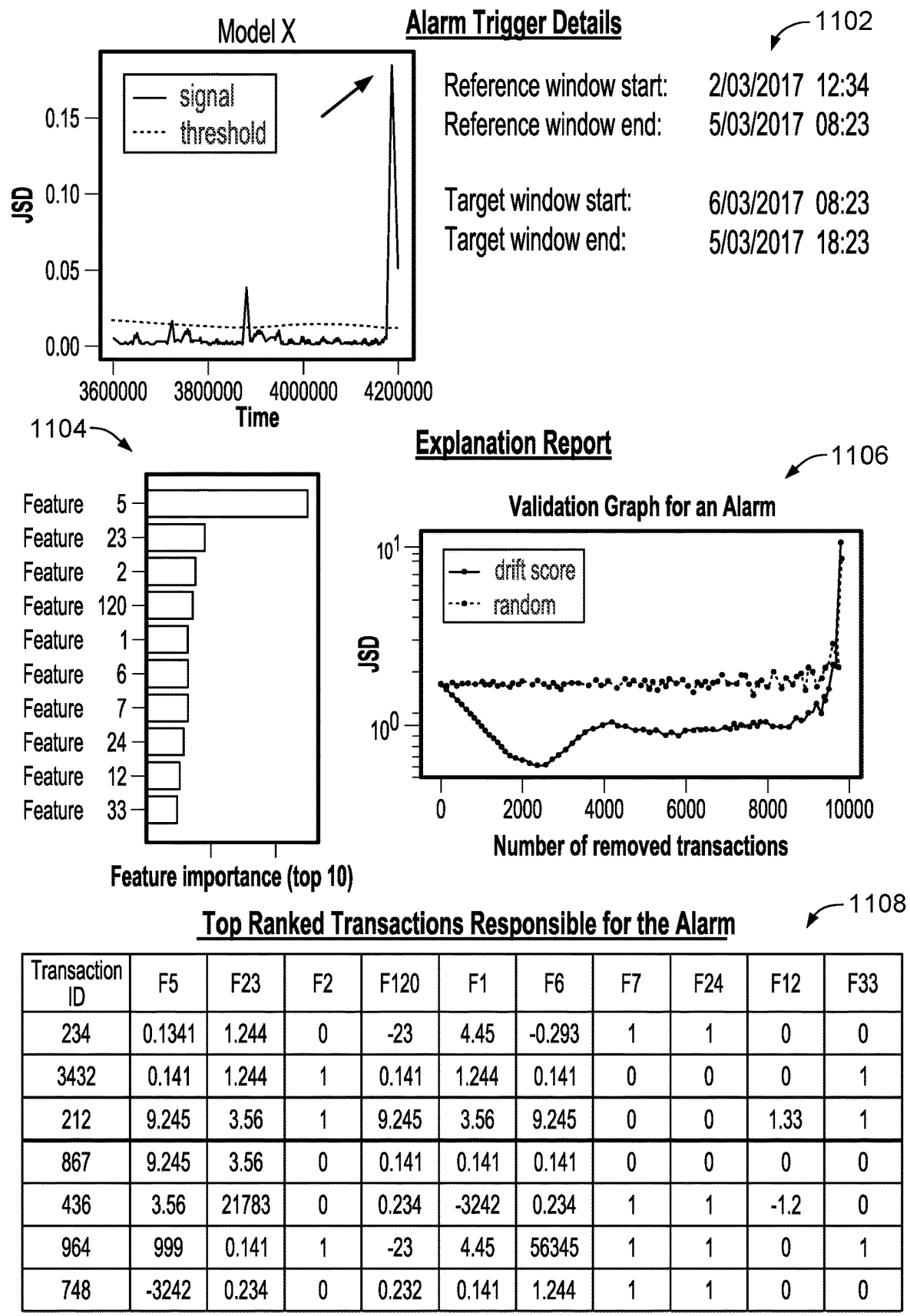
FIG. 11 shows an example of an explanation report according to an embodiment of the present disclosure.

First, techniques for determining a signal by automatic model monitoring are described (FIGS. 2-4D). Next, techniques for determining an adaptive threshold are described (FIGS. 5-8). Finally, techniques for explanation reporting based on dissimilarities are described (FIGS. 9-11). FIG. 12 shows an example of a system for fraud detection in which the disclosed techniques can be applied.

Figure 2:
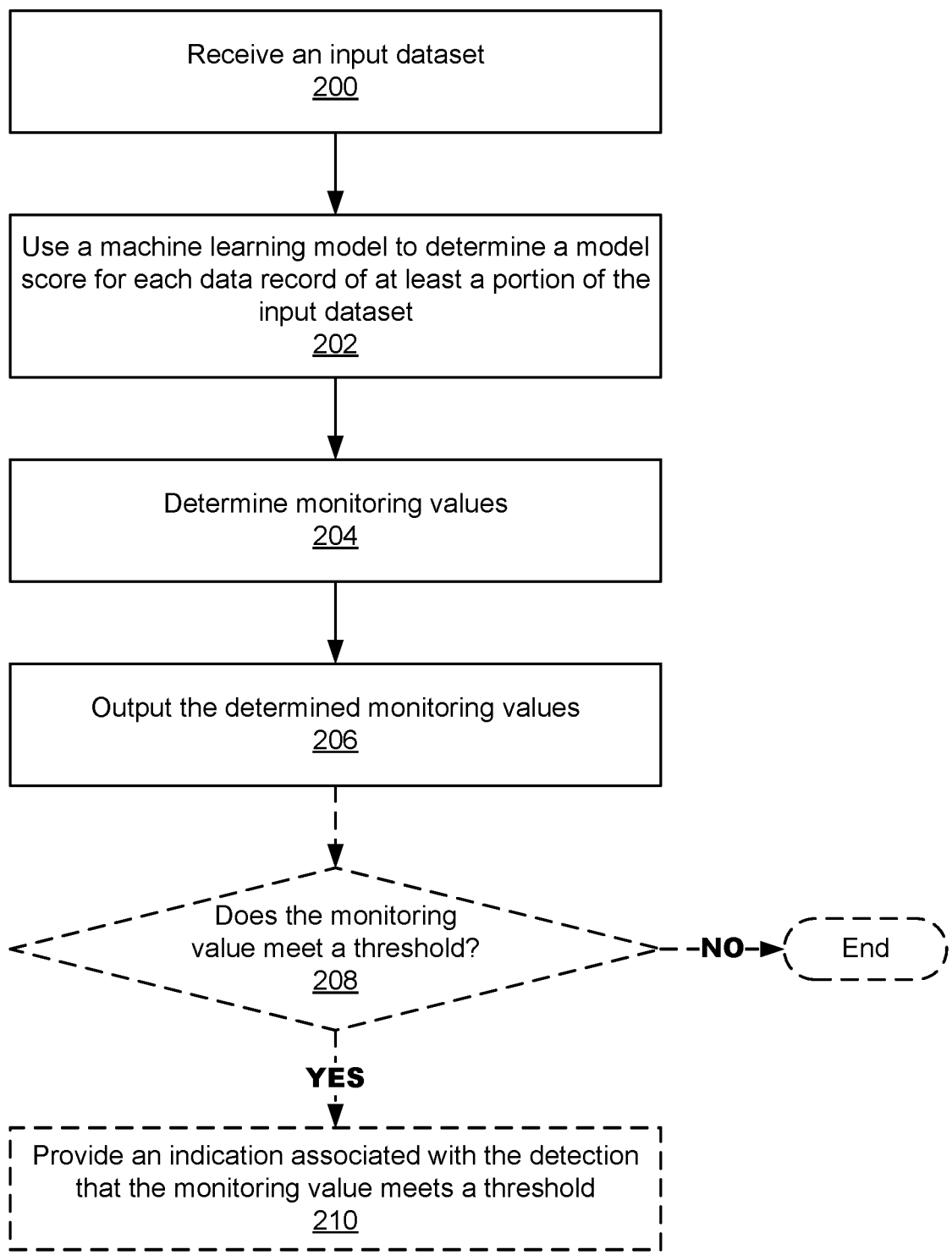
FIG. 2 is a flow chart illustrating an embodiment of a process for automatic model monitoring for data streams.

FIG. 2 is a flow chart illustrating an embodiment of a process for automatic model monitoring for data streams. The process can be performed by a device such as node 1242.1 or 1242.2 of cluster 1240 (alone or in cooperation) or by a processor such as the one shown in FIG. 13.

The process begins by receiving an input dataset (200). In various embodiments, the input dataset includes events/data records in a stream of data. The input data may be received and processed in real time or near real time. For example, events representing financial transactions are received one-by-one as orders for drinks come in from a coffee shop merchant. As another example, the input data is received from a credit card issuer wishing to verify whether transactions are fraudulent. An example of how data is collected by transaction devices and becomes input data to this process is shown in FIG. 12. Referring to FIG. 4A, which shows streaming data made up of events (the black circles), the input dataset includes events in target window T. The process of FIG. 2 can be repeated on new events that are received as data streams in. For example, as new events are received, the target window slides to the right so that in a subsequent iteration of the process, the input dataset includes the new events as further described below.

The process uses a machine learning model to determine a model score for each data record of at least a portion of the input dataset (202). A trained machine learning model takes the data as input and outputs a model score. A variety of machine learning models or other scoring methods can be used. Examples include (but are not limited to) random forests, gradient boosting models, neural networks, logistic regression, support vector machines. Examples of model scores are shown in FIG. 1B. For each data record (circle in FIG. 1A), a machine learning model determines a corresponding model score (bar in FIG. 1B).

Returning to FIG. 2, the process determines monitoring values (204). Each monitoring value is associated with a measure of similarity between model scores for those data records of the input dataset within a corresponding moving reference window and model scores for those data records of the input dataset within a corresponding moving target window. For example, a monitoring value is a measure of similarity between a model scores histogram in a reference window R and a model scores histogram in a target window T The T window contains the most recent events collected. The R window contains events in a reference period prior to the target window T. The reference and target window sizes can be fixed-size (predetermined number of events) or fixed-time (predetermined time duration). The windows can be contiguous or homologous, as further described with respect to FIGS. 4A-4C. An example of monitoring values is the signal shown in FIG. 1C, which is made up of a series of monitoring values.

The similarity between a model scores histogram in the reference window R and a model scores histogram in the target window T can be measured using a metric. One type of similarity metric is the Jensen-Shannon divergence. The Jensen-Shannon divergence measures mutual information between the random variable generated by a binary mixture model of the two distributions and the corresponding binary indicator variable. The Jensen-Shannon divergence is bounded and symmetric. When the distributions are the same, the measure goes to zero. When distributions have disjoint domains, the measure goes to log 2 (or 1 if entropy is measured in Shannon units). In addition to binary classification, the Jensen-Shannon divergence is also suitable for multi-dimensional distributions to compute the signal (monitoring values) in multi-class model monitoring use cases. The Jensen-Shannon divergence is an attractive similarity measure because it is stable, less noisy, and sensitive to relative magnitude. Other types of similarity metrics include the Kolmogorov-Smirnov, Kuiper, and Anderson-Darling test statistics. Any of these metrics or other metrics can be used to determine the similarity between the histograms.

The monitoring value can be calculated in a variety of ways using a similarity metric. Given a similarity metric, the corresponding monitoring value is calculated by applying an estimation procedure. By way of non-limiting example, the Jensen-Shannon divergence can be estimated by summing individual divergence contributions for each bin (comparing each bin in the histogram of model scores of the target window T with the same corresponding bin in the histogram of model scores of the reference window R). Other estimation procedures can be used for a given metric.

The process outputs the determined monitoring values (206). In various embodiments, the monitoring values are output by rendering the monitoring values on a graphical user interface. FIG. 1C shows an example of a signal made up of monitoring values plotted alongside a threshold. Another way the monitoring values can be output is outputting the monitoring values for further processing. In some embodiments, the process terminates after performing 206. In some embodiments, the process (optionally) proceeds by comparing the monitoring value(s) to a threshold and providing an indication that the monitoring value(s) meets/exceeds a threshold as follows.

Figure 5:
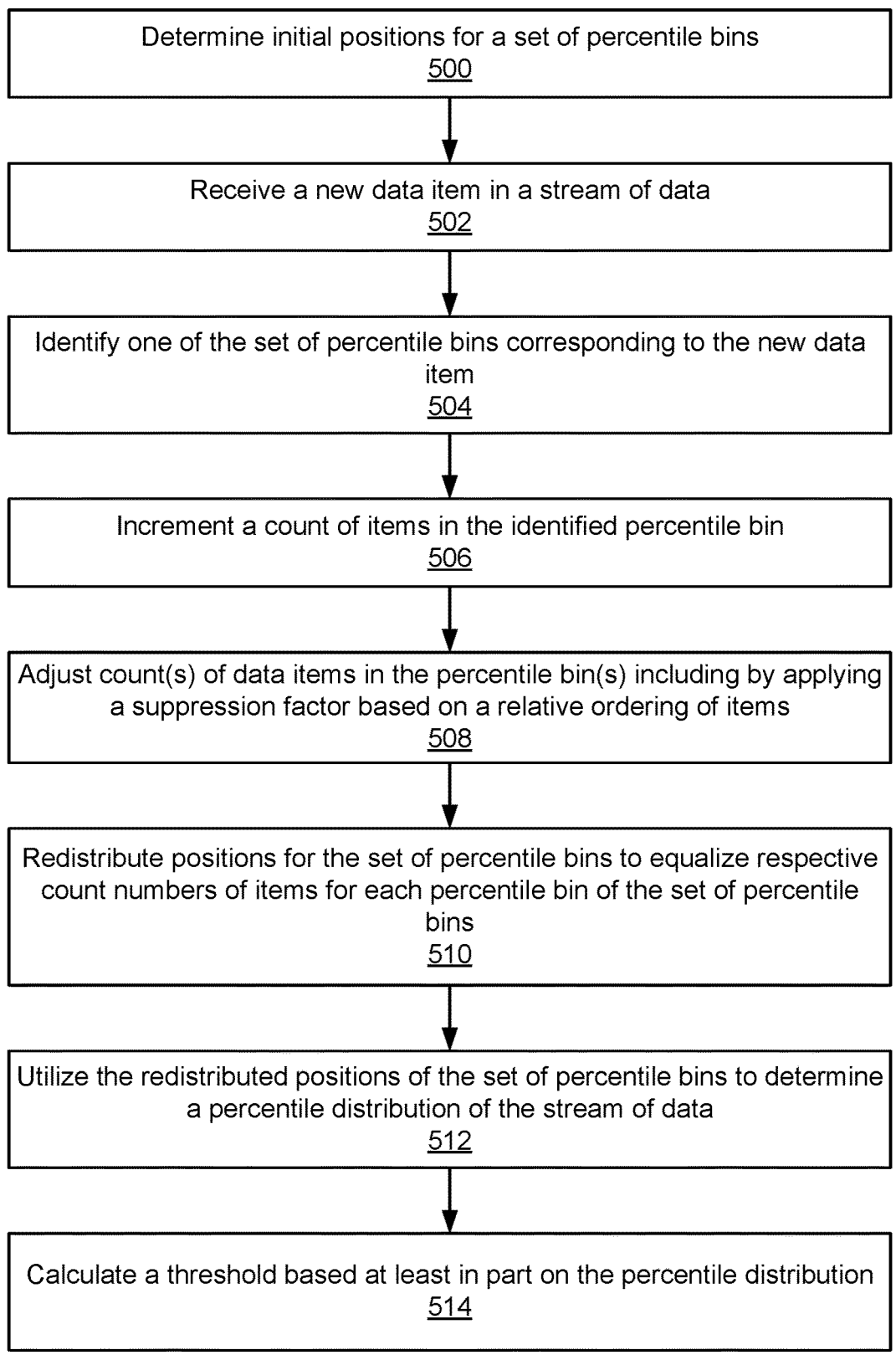
FIG. 5 is a flow chart illustrating an embodiment of a process for adaptive threshold estimation for streaming data.

The process detects that at least one of the monitoring values meets a threshold (208). When a monitoring value exceeds the threshold, a number of responses are possible. For example, the process triggers an alarm and the generation of an explanation report. As another example, the process blocks the attack (e.g., bot attack) and reports the attack to an administrator. As yet another example, the process reports that an attack happened and provides an explanation report listing transactions that may have been fraudulent. The threshold can be determined by applying an adaptive streaming percentiles estimator, an example of which is shown in FIG. 5. In some embodiments, if the monitoring value does not meet the threshold, the process continues processing transactions in a streaming fashion until the next monitoring value meets a threshold or until the data stream terminates.

The process provides an indication associated with the detection in response to the detection that at least one of the monitoring values meets the threshold (210). An indication (such as an alarm) is a notification of a change in behavior as indicated by the monitoring value meeting or exceeding a threshold. In some embodiments, a single indication is provided. In other embodiments, multiple indications are provided. For example, the process generates a first indication when a monitoring value has met the threshold and is rising. Later, the process generates a second indication when the monitoring value stops rising. This indicates a peak in the signal (monitoring values). When the process generates a single indication, it can output either the first indication (when monitoring values are rising) or the second indication (when the monitoring value is at a peak). An example of an indication is further described with respect to FIG. 9.

In some embodiments, the process terminates after 206 (or 208) when there are no more new data records. In some embodiments, additional iterations of the process can be performed by returning to 200 to receive new data records after 206 (or 208 if the monitoring value(s) do not meet the threshold or after 210). For example, as time progresses new events may be collected in a data stream so returning to 200 means another iteration of the process is performed to process the new events/data records that have come in. In some embodiments, the process is performed in a single iteration on a complete data set (after all events in a data stream have been collected) such as when testing the process or analyzing data not in real time.

The process will now be described using the example windows shown in FIGS. 3A-3C. In this example, the input data stream represents orders at a coffee shop. Each dot represents an event/data record, namely an order for a drink at the coffee shop. As shown in the input data stream, there are more orders each day in the morning around 6:00 and at noon. Since this is expected behavior (people tend to order more coffee in the early morning and at noon), the spike of activity is not fraud.

Figure 3A:
FIG. 3A shows an example of a target window and a reference window for an input data stream at a first point in time according to an embodiment of the present disclosure.

FIG. 3A shows an example of a target window and a reference window for an input data stream at a first point in time according to an embodiment of the present disclosure. The windows can be used to calculate a monitoring value at 204 of FIG. 2.

In FIG. 3A, events are received in a stream of data and the current time is Monday at 0:00. The oldest events are at the left side of the plot (beginning at 0:00 on Friday) and the most recent events are at the right side of the plot. The target window T contains the most recent four events. The reference window R contains earlier events, which are the four events immediately preceding the events in the target window in this example.

Figure 3B:
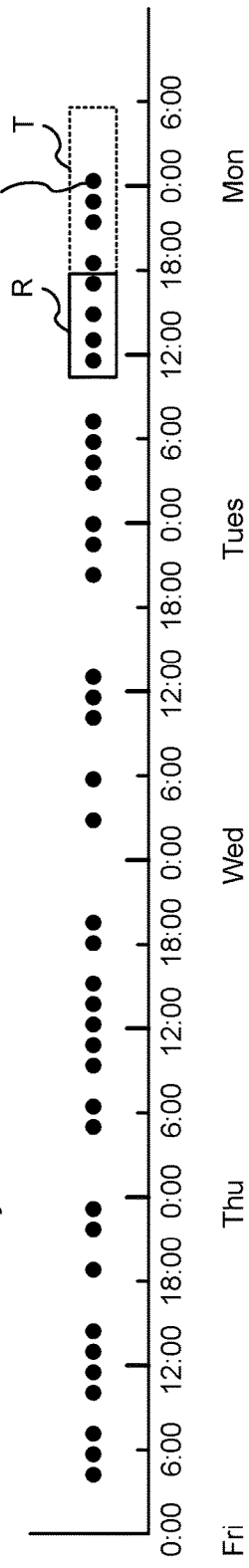
FIG. 3B shows an example of a target window and a reference window for an input data stream at a second point in time according to an embodiment of the present disclosure.

FIG. 3B shows an example of a target window and a reference window for an input data stream at a second point in time according to an embodiment of the present disclosure. The time is now Monday at 6:00, and a new event is received. Compared with FIG. 3A, the target window T moves forward in time (i.e., to the right) to contain the four most recent events. Similarly, the reference window R also moves to contain the four events immediately preceding window T.

Figure 3C:
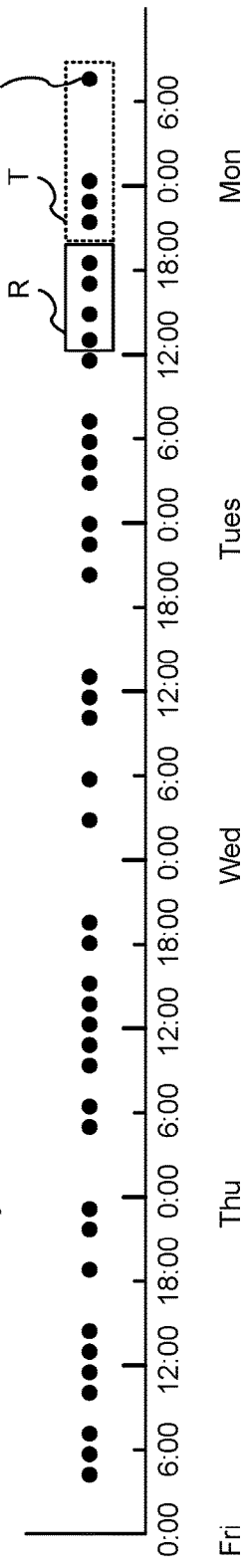
FIG. 3C shows an example of a target window and a reference window for an input data stream at a third point in time according to an embodiment of the present disclosure.

FIG. 3C shows an example of a target window and a reference window for an input data stream at a third point in time according to an embodiment of the present disclosure. The time is now Monday at 8:00, and a new event is received. Compared with FIG. 3B, the target window T moves forward in time (i.e., to the right) to contain the four most recent events. Similarly, the reference window R also moves to contain the four events immediately preceding window T.

At each point in time, the monitoring value is determined by comparing the similarity between model scores for the events in the reference window R and model scores for the events in the target window T For example, the Jensen-Shannon divergence is applied to events in windows R and T to determine the similarity. The monitoring value at Monday 0:00 (FIG. 3A) may be different from the monitoring value at Monday 6:00 (FIG. 3B), which in turn may be different from the monitoring value at Monday 8:00 (FIG. 3C).

Figure 4C:
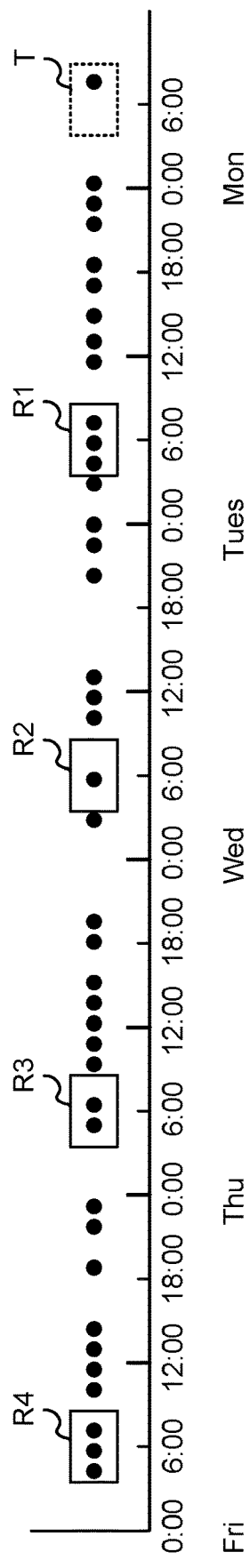
FIG. 4C shows an example of homologous windows according to an embodiment of the present disclosure.

In the examples in FIGS. 3A-3C, the reference window R and target window T are contiguous meaning that they are immediately next to each other. FIGS. 4A-4C show examples of different types of windows.

FIG. 4A shows an example of fixed-size contiguous windows according to an embodiment of the present disclosure. Here, window R and window T are fixed-size contiguous windows. The T window contains the most recent $n_T$ events collected. The R window contains $n_R$ events in a reference period immediately before T. In this example, the fixed size is four events so each of the windows R and T contains four events. Contiguous windows may be attractive for detecting changes in behavior occurring in relatively short time scales (e.g., a few hours to a few days). A contiguous R window is well suited for short time scales because it provides a comparison between the T window and the most recent events preceding it. In some embodiments, for long-lived alarms, the process freezes the time location of the R window temporarily and slides only the T window forward in time until the alarm is over to avoid an exit peak. A long-lived alarm is one that lasts longer than the combined size of the target and reference windows.

The window size can be selected in a variety of ways. The size of the T window can be defined in units of the average number of events in some period (e.g., one hour, half a day, or one day). In an embodiment, the default size of the R window is three times the average number of daily events and the size of the T window is 0.5 times the average number of daily events.

Although in this example both T and R are the same size, they can be different sizes in other embodiments. For example, the R window size is chosen to be a multiple of the T window size (e.g., five times larger). The window can be sized based on the characteristics of the expected data. In various embodiments, the R window is at least as large as the T window in order to be more stable than the T window. The reference window defines the normal behavior so its histogram should not be noisier than the T histogram. The size of the R window and T window affects the amount of noise in the signal. Very short windows (e.g., 100 times smaller than the average number of daily transactions) tend to generate noisy signals, which result in more false alarms. On the other hand, very large windows (e.g. 30 times the average number of daily transactions) can make the signal insensitive to small changes in the distribution of model scores.

In various embodiments, fixed-size windows provide better control of estimators compared with other types of windows, since a fixed-size window fixes the dependency of the variance on the sample size and sample sizes are the same for all windows. In contrast, when comparing monitoring values for two different events using time-based windows, the comparison is made using monitoring values computed with two different sample sizes.

FIG. 4B shows an example of time-based contiguous windows according to an embodiment of the present disclosure. Here, window R and window T are fixed-time contiguous windows. The T window contains the events collected in the past 5 hours. The R window contains events in a reference period (5 hours) immediately before T In this example, there is one event in T and two events in R.

FIG. 4C shows an example of homologous windows according to an embodiment of the present disclosure. Homologous windows can be used to calculate a monitoring value at 204 of FIG. 2. Homologous windows are regularly spaced windows with the same time duration as the corresponding target window. Thus, for a fixed-time target window, the corresponding homologous windows are also fixed-time. For a fixed-size target window (which will have a variable time duration), the corresponding homologous windows will have a matching (variable) time duration. Homologous windows may be used, for example, to cover the same period of the target window but on different previous days.

Homologous windows may be attractive for detecting changes in data with a strong seasonal behavior. An example of data that exhibits strong seasonality is certain types of events occurring more frequently at certain times of the day. For example, people tend to order coffee more frequently in the morning than the rest of the day. Thus, a coffee shop in a business district will see increased activity every weekday morning.

The R window is a set of replica windows occurring in the same period of the day as the T window but on previous days (homologous periods). In FIG. 4C this is depicted as reference windows R1-R4, which occurs around 6:00 on Monday through Thursday. More specifically, T occurs between 4:00 and 8:00 on a Friday, so a homologous window configuration with four replicas containing events from the four previous days (Monday through Thursday) from 4:00 to 8:00. The size of the reference window is not fixed, but its time duration is fixed to be the same as the T window duration in this example.

When comparing events in references windows R1-R4 and target window T, a histogram is made combining R1-R4, which is then compared with the histogram corresponding to target window T. In the coffee scenario, contiguous windows may induce repetitive (e.g., daily) alarms because customers do not order many coffees after midnight and order many coffees in the early morning. On the other hand, homologous windows correct for such seasonality by recognizing that the repetitive behavior of many coffee orders each day in the early morning is similar to each other. Whether to use contiguous or homologous windows is configurable. For example, a user can set a system to use contiguous windows when expecting a certain type of data or homologous windows when expecting a different type of data.

Figure 4D:
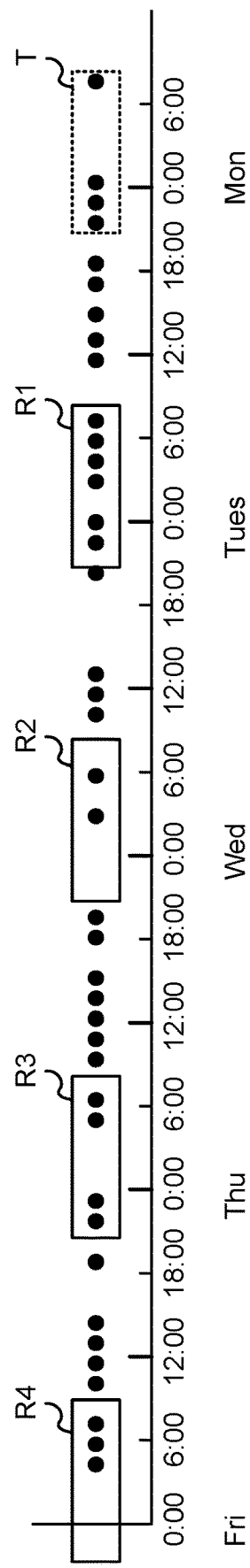
FIG. 4D shows an example of homologous windows according to an embodiment of the present disclosure.

FIG. 4D shows an example of homologous windows according to an embodiment of the present disclosure. Unlike FIG. 4C in which the target window T is defined based on time (5 hours), the target window here is fixed size, namely four events. As shown, the target window T includes four events, which correspond to approximately 12 hours (20:00 to 8:00) so the reference windows on the previous days (Friday through Tuesday) are also from 20:00 to 8:00.

The monitoring values obtained using the windows comparison are then compared with a threshold to determine changes in behavior. The threshold can be determined as follows.

Adaptive threshold estimation for streaming data is disclosed. An adaptive streaming percentiles estimator estimates percentiles for streaming data by using a fixed number of bins that are updated in a single linear pass. If a new monitoring value stands out compared with a distribution of previous monitoring values, then an alarm can be raised to further study the occurrence/anomaly or take remedial action. A threshold based on the estimated percentile can be used for automatic model monitoring. For example, the threshold is used as the threshold at 208 of FIG. 2 such that a monitoring value meeting or exceeding the threshold causes an indication (e.g., alarm) to be generated. The adaptive streaming percentiles estimator can be used for any streaming data including but not limited to fraud detection and analyzing user profiles.

The threshold can be calculated using a fixed percentile or a Tukey fence. A fixed percentile defines outlier values for the signal by flagging all values that fall in the upper tail of the distribution computed with the whole series (e.g., above the 95th percentile).

A Tukey fence is an alternative definition of outlier that focuses on the width of the central part of the distribution. For example, the outlier can be given by an upper Tukey Fence:

$$Q3 + k(Q3 - Q1) \qquad (1)$$

where Q1 is the first quartile and Q3 is the third quartile. k>0 is a tunable parameter that controls how much the threshold is above Q3. For example, for a Gaussian distribution, k=1 corresponds to percentile 97.7 and k=1.5 corresponds to percentile 99.7. The upper Tukey fence may be attractive for streaming data because it focuses on the central part of the distribution. In a streaming data environment, any two consecutive values of the signal time series are highly correlated. This is because there is only one new instance entering the T window when a new event arrives (as described with respect to FIGS. 3A-3C). Thus, changes accumulate slowly and the signal varies almost continuously. This means that when a peak occurs in the signal, not only the value of the signal at the peak but also the neighboring points (which tend to be large as well) contribute to the tail of the distribution. Hence, the upper Tukey fence is an attractive choice because it is less sensitive to the tail.

Both methods (fixed percentile or Tukey fence) rely on the estimation of percentiles. The percentile estimation techniques described below can be applied to both methods as well as other outlier definitions. The techniques are reliable and flexible and can be used to calculate a threshold in either of the cases (fixed percentiles or Tukey fence) described above. In various embodiments, a fixed number of bins are updated all at once, with a single linear pass, which can then be used to estimate any percentile through interpolation. This approach is a stochastic approximation of the cumulative distribution function. When each new event is received, the percentiles are updated to restore an invariant such that the average count per bin is the same for all bins.

FIG. 5 is a flow chart illustrating an embodiment of a process for adaptive threshold estimation for streaming data. The process can be performed by a device such as node 1242.1 or 1242.2 of cluster 1240 (alone or in cooperation) or by a processor such as the one shown in FIG. 13.

The process begins by determining initial positions for a set of percentile bins (500). The initialization is performed as follows. The initial positions are determined using the first values that stream into the system. The number of percentile bins (n) can be pre-defined. For the first n+1 events that stream in, the event values are inserted into a global list P in sorted order. This initializes an estimate of the n+1 percentile positions. In various embodiments, the first n+1 events are unique. If they are not unique, then the initialization step includes injecting numerical noise into the event values, so that all initial percentile position values are unique.

The process receives a new data item in a stream of data (502). The process consumes the data items (also called "records" or "events") as they stream into the system. The percentile position estimates are updated as events stream in. For each incoming event the percentile position estimates in global list P are updated taking into account the incoming event value and the current total count C. Redistributing positions updates the percentiles in each bin while maintaining the invariant that the estimated number of counts in each bin is the same for all bins as follows.

The process identifies one of the set of percentile bins corresponding to the new data item (504). The incoming data record can be classified into one of the bins. The process finds the appropriate bin and accounts for the incoming event as follows.

The process increments a count of items in the identified percentile bin (506). This accounts for classifying the incoming data record as belonging to the identified percentile bin. Increasing the count breaks the invariant, so the process will proceed to update percentiles as follows.

The process adjusts one or more counts of data items in one or more of the percentile bins including by applying a suppression factor based on a relative ordering of items (508). The suppression factor can be thought of as a forgetting factor (e.g., assigning a lower weight to older events) that makes an estimation of percentiles adaptive. This may be better for streaming data where the local distribution of monitoring values varies considerably over time, which leads to more accurate results. The suppression factor is predetermined (e.g., selected by a user) and can be applied as further described with respect to FIG. 8.

Figure 6:
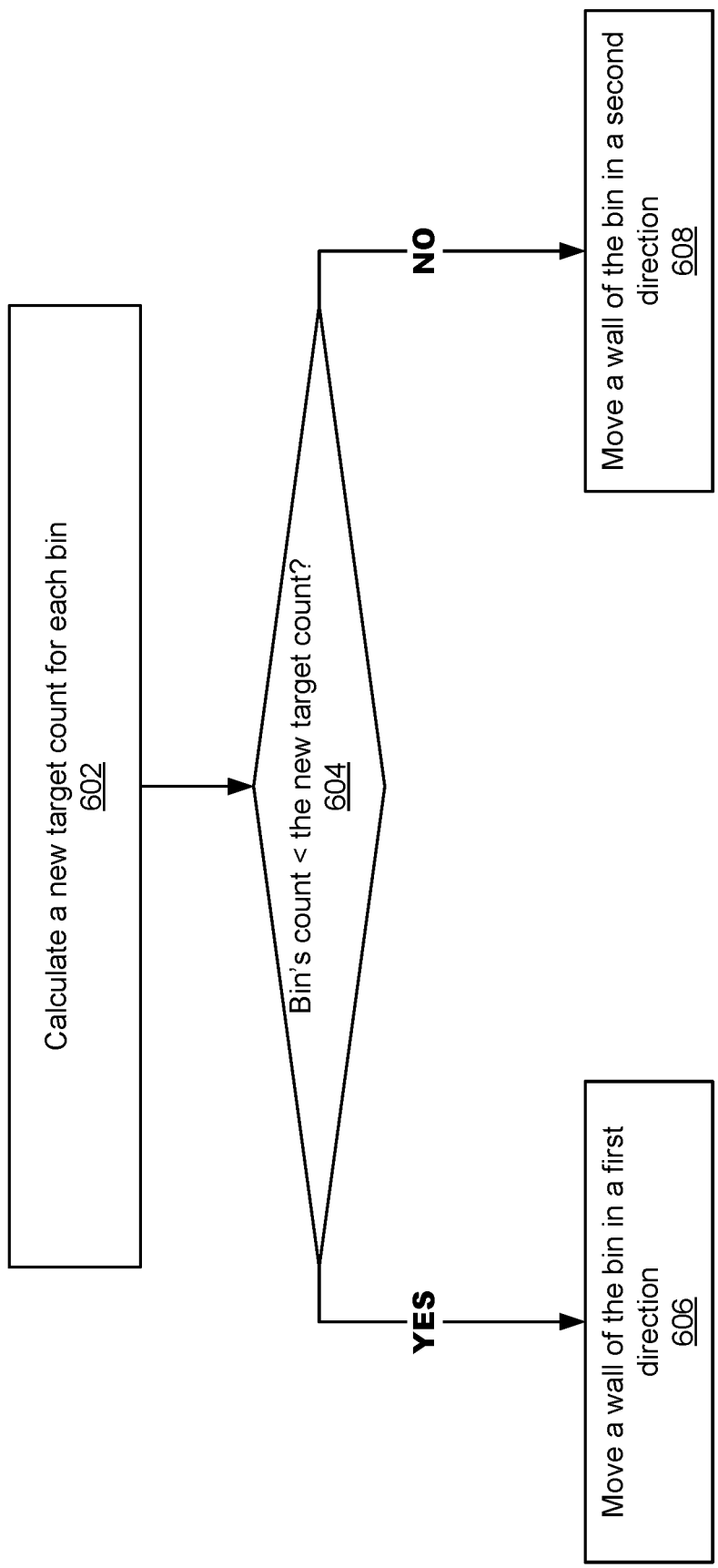
FIG. 6 is a flow chart illustrating an embodiment of a process for redistributing positions for a set of percentile bins.

The process redistributes positions for the set of percentile bins to equalize respective count numbers of items for each percentile bin of the set of percentile bins (510). Redistributing positions of the bins restores the invariant after it was broken in 506. The process calculates a new target count for each bin and adjusts the size of each of the bins based on whether the count of a bin is less than or greater than the new target count. If the count of the bin is equal to the new target count then no adjustment is made to the bin's size. An example of a process for redistributing positions is shown in FIG. 6.

The process utilizes the redistributed positions of the set of percentile bins to determine a percentile distribution of the stream of data (512). The set of percentile bins that results from 508 gives a percentile distribution of the stream of data. The height of each bin is the same (the invariant). This provides a good resolution so that regions of low density and high density are covered in the same way. The percentile distribution gives an indication of whether a current event is anomalous. If the event is uncommon (goes above percentile 75 for example), then this may indicate a change in behavior such as fraud.

The process calculates a threshold based at least in part on the percentile distribution (514). In various embodiments, the threshold is obtained by applying an outlier definition. By way of non-limiting example, the outlier definition can be a fixed percentile or a Tukey fence.

In various embodiments, the threshold is obtained by further processing the outlier definition using delayed exponential weighting on previous estimates to obtain a final threshold. Applying delayed exponential weighting may be attractive because a local distribution of monitoring values can vary considerably with time if the data is non-stationary. Therefore, defining a threshold based on all past monitoring values may provide an inaccurate estimate of the local distribution of monitoring values (for example in the last month). The threshold can account for this by being adaptive and giving greater weight to more recent transactions as further described below.

The disclosed adaptive threshold estimation techniques have many advantages over existing methods by being more space-efficient, time-efficient, and reducing processing cycles needed to process streaming data. In one aspect, the process stores only a fixed size O(n) object with the positions of n+1 percentile estimates P [P0, P1, . . . , Pn], where P0 and Pn provide estimates of the lower/upper range of the domain of the distribution, respectively. In another aspect, the time complexity for each incoming event is O(n), so that on any new event all percentiles are updated in a single pass over the percentiles object. This means that in a streaming implementation each event is processed only once and the new estimate P only depends on the last estimate. Conventional methods tend to be more resource-intensive because they sample previously observed instances and keep them in memory, which requires managing clusters of samples including sorting operations.

The process shown in FIG. 5 can be repeated for each new additional data record received until an entire data stream is processed.

FIG. 6 is a flow chart illustrating an embodiment of a process for redistributing positions for a set of percentile bins. The process can be performed as part of another process such as 510 of FIG. 5.

The process calculates the new target count for each bin (602). In various embodiments, the new target count is the mean number of events per bin after adding the new event. Then, the process loops over all bins from left to right. For each bin, the process determines whether the bin's count is less than the new target count (604).

If the bin's count is less than the new target count, the process moves a wall of the bin in a first direction (606). In various embodiments, the process moves the right wall of the bin to the right (the first direction). This "eats into" a portion of the next bin (to the right of the current bin) based on its density.

If the bin's count is greater than the new target count, the process moves a wall of the bin in a second direction (608). The bin's count is greater than the new target count after encountering the bin into which the current event is sorted. In various embodiments, the process moves the left wall of the bin to the left (the second direction). This "sheds away" a portion to the next bin (to the right of the current bin) based on the current bin density.

Moving the walls of the bins (606 and 608) redistributes the positions of the bins so that the end result after all of the bins have been processed is that an invariant, namely the new target count, is maintained. The next figure shows an example of redistributing the positions by moving bin walls.

Figure 7:
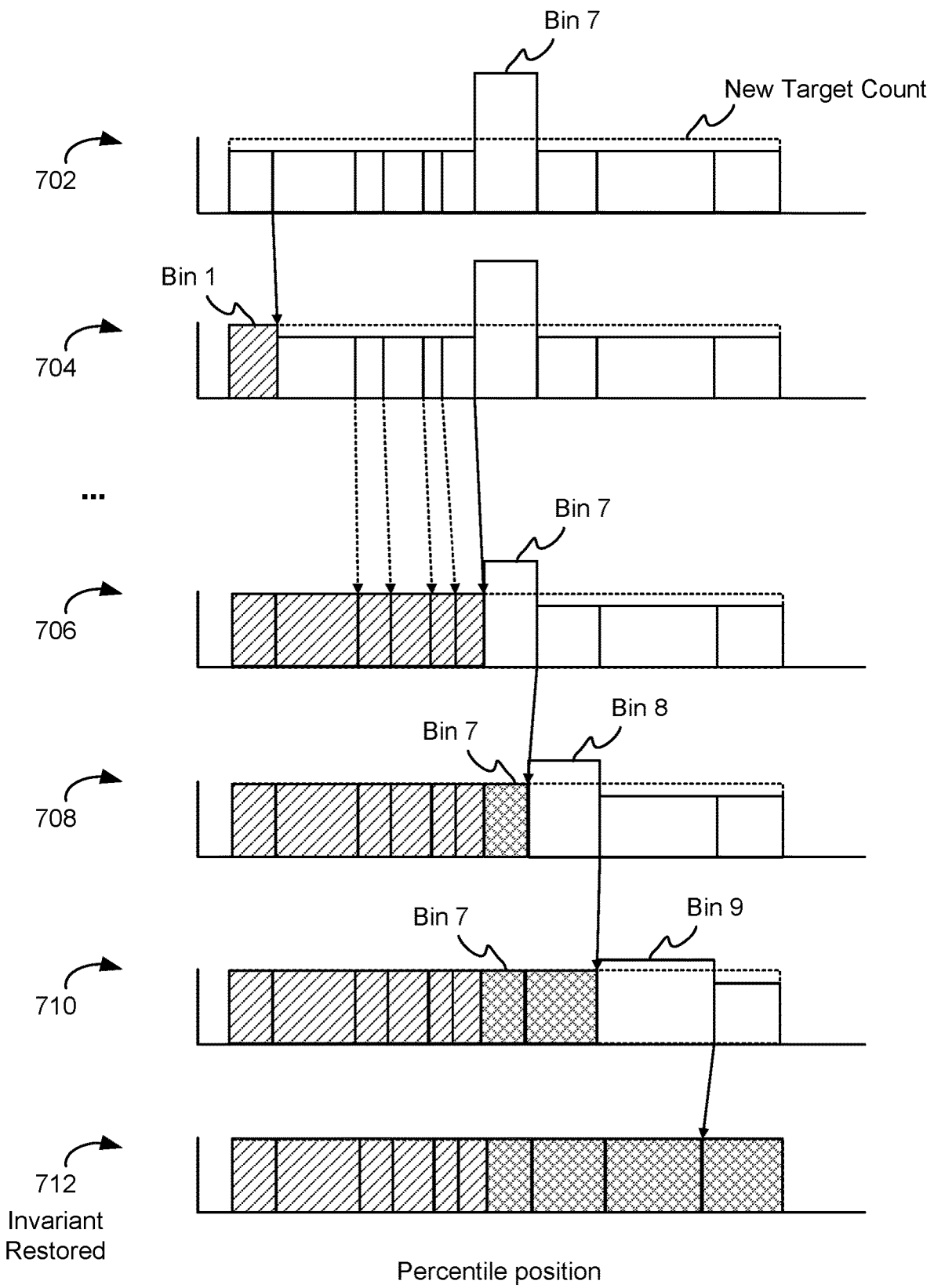
FIG. 7 shows an example of bins that are processed using an adaptive streaming percentiles estimator according to an embodiment of the present disclosure.

FIG. 7 shows an example of bins that are processed using an adaptive streaming percentiles estimator according to an embodiment of the present disclosure. Histogram 702 contains 10 bins where each bin is a percentile bin meaning that its wall (or boundary) represents an estimated percentile position of the events in the bin. The height of the bin represents how many events fall into that bin. Lower density bins are wider and higher density bins are narrower.

The height of the bins is an invariant that is maintained so that the heights of the bins are the same and the widths vary depending on how much the events are distributed. In various embodiments, the height is maintained as an invariant so that by the end of the redistribution process shown here the heights of all of the bins are the same (712). At intermediate steps (e.g., 704-710) the heights are not necessarily the same and the wall of the bin is moved to maintain the correct count for each bin. By the end of the redistribution process, the invariant (height) is restored for all bins.

When a new event is received, the event is placed (accounted for) in a bin and the bins are redistributed to maintain the same height for all bins while the widths are adjusted. In this example, the new event falls into Bin 7 so the count of Bin 7 increments as represented by its taller height compared with the other bins. That is, state 702 of the histogram is the result after performing 506 of FIG. 5. States 704-712 of the histogram show what happens when walls of the percentile bins are redistributed (moved) to equalize respective count numbers for each percentile bin. Moving bins walls corresponds to 510 of FIG. 5 and FIG. 6. Equalizing respective count numbers means restoring/maintaining an invariant across all bins.

The new target count (corresponding to 602 of FIG. 6) is represented by the dashed line. The process of FIG. 6 loops through all of the bins, and state 704 shows what happens when bins are redistributed by passing through the bins from left to right. Each of the bins will be updated by moving a wall of the bin to restore the invariant so that all of the bins are the same height.

Bin 1 (highlighted) is adjusted because the bin's count (height) is less (lower) than the new target count. The new target count can be a whole count or a fraction of a count. The bin is adjusted by making it taller (to reach the height of the new target count) and moving the right wall of the bin to the right. This corresponds to 606 of FIG. 6. Returning to FIG. 7, after 704, Bins 2-6 are each processed in the same way by moving their right walls to the right because the count of each of the bins is less than the new target count. State 706 shows the bins after Bins 1-6 have been processed.

Referring to state 706, the count of Bin 7 is greater than the new target count (taller than the dashed line). Since Bin's 7 count is not less than the new target, the right wall of Bin 7 is moved to the left and its height is lowered to meet the new target count. This corresponds to 608 of FIG. 6. Moving the right wall of Bin 7 to the left causes the height of the right adjacent bin (i.e., Bin 8) to increase as shown at 708.

After adjusting the count of Bin 8, the count of Bin 8 exceeds the dashed line representing the target count.

Returning to FIG. 7, Bins 8-10 are each processed in the same way as Bin 7 by moving their right walls to the left. Referring to state 708, the count of Bin 8 exceeds the new target count, so its right wall is moved to the left. Consequently the count of Bin 9 is increased as shown. Next, at state 710, the right wall of Bin 9 is moved to the left because the count of Bin 9 exceeds the new target count. Consequently, the count of Bin 10 is increased as shown in 712. Because of the way the new target count was calculated, the resulting state of Bin 10 (and Bins 1-9) are such that the invariant is restored. State 712 shows the bins after Bins 8-10 have been processed. Bin 7 and the bins to the right (i.e., Bins 8-10) are shaded in a different pattern from the other bins to more clearly distinguish the two groups of bins from each other.

In some embodiments, the new event (which was placed in Bin 7 here) is smaller than the smallest value in the histogram. In this situation, the event is placed in Bin 1 and the left wall of Bin 1 is moved to the left to account for the event being smaller than the smallest value previously seen and Bin 1's count increases accordingly. Similarly, if the new event is larger than the largest value in the histogram, the event is placed in Bin 10 and the right wall of Bin 10 is moved to the right to account for the event being larger than the largest value previously seen and Bin 10's count increases accordingly.

In various embodiments, redistributing positions creates a directional bias in the estimate because the percentiles are updated from left to right. One way to correct this bias is to apply the update from right to left (in addition to left to right described above) and average the two results (i.e., the left to right pass and the right to left pass).

Another way to correct the bias that avoids duplicating the amount of work, is to choose between a left-right or right-left pass on each new incoming event either in an alternate way or with equal probability (to avoid reintroducing bias if the stream contains unfavorable correlations).

Next, updating the percentile distribution of the stream of data including by applying a suppression factor for each iteration to assign a lower weight to older events will be described (e.g., 512 of FIG. 5).

There are a variety of suppression factors (and ways to apply them) and the following example is merely illustrative and not intended to be limiting. One way of applying the suppression factor is to suppress the total count, which suppresses the histogram on any incoming event. For example, prior to adding a new event value to a bin (506), all bins are suppressed (e.g., multiply all values by 0.99). This gives higher weight to counts in bins that have recently received an instance, and suppresses the counts of bins that have not received instances recently. Here the suppression is applied at the level of the counts on the histogram to "forget" previous events directly. This is also memory lighter, because the total histogram count is saved without needing to save other values, whereas additional smoothing (as proposed by conventional techniques) requires saving all the smoothed out percentiles as well.

The suppression can be time-based or index-based. For example, index-based suppression uses a constant (index-based) decay rate $0<\gamma<1$ where $n_{1/2}^{\gamma}=-\log_2\gamma$ is the number of events to be processed to achieve a suppression factor of ½. In one framework, this would be several times the total number of events in the T plus R windows so that a higher importance is given to more recent monitoring values.

One advantage of an adaptive threshold based on Tukey Fences (with a forgetting factor) is that it gives greater weight to more recent monitoring values, so it adapts to changes in the distribution of monitoring values. However, this also means that when the signal starts increasing near an alarm, the threshold also tends to increase. To address this issue, a delay can be applied so that the threshold is more sensitive to monitoring values before the target window. A side effect of this approach is that the threshold increases, with a delay, after the peak in the signal. This prevents immediate alarms due to large signal fluctuations while the windows are passing through the alarm region. This may be desirable if one wants to prevent immediate alarms while the R and T windows have time to refill with new events. In an alternative embodiment, the adaptive streaming percentiles estimator is paused to prevent processing of monitoring values while the signal is larger than the threshold.

In various embodiments, a delay is applied through a delayed exponential moving (EM) average. This is attractive because a constant size state, to be updated on each new event, is saved without needing to store anything else. If the threshold values are $\tau_i$ with $i=0, 1, \ldots, j$ where $j$ is the index of the latest event, then the EM sum is defined as:

$$S_j^{\alpha}=\Sigma_{i=0}^{j}\alpha^{j-i}\tau_i=\tau_j+\alpha S_{j-1}^{\alpha} \tag{2}$$

where $S_j^{\alpha}$ is the EM smoothed out threshold sum, and $0<\alpha<1$ is the EM decay rate parameter. Similarly, for the EM count $N_j^{\alpha}=1+\alpha N_{j-1}^{\alpha}$, the delayed EM sum (or count) can be obtained by subtracting a second EM sum with a stronger decay rate $\beta$:

$$S_j^{\alpha\beta}=\Sigma_{i=0}^{j}(\alpha^{j-i}-\beta^{j-i})\tau_i=\alpha S_{j-1}^{\alpha\beta}+(\alpha-\beta)S_{j-1}^{\beta} \tag{3}$$

The delayed EM average for the threshold is defined by dividing the delayed sum and delayed count to obtain a threshold:

$$\tau_j^D = \frac{\sum_{i=1}^{j}(\alpha^{j-i}-\beta^{j-i})\tau_i}{\sum_{i=1}^{j}(\alpha^{j-i}-\beta^{j-i})} = \frac{S_j^{\alpha\beta}}{N_j^{\alpha\beta}} \tag{4}$$

This threshold is adaptive because it forgets older values of the signal. The decay rate parameter is related to the half-decay length $n_{1/2}^{\alpha}=-\log_2\alpha$ (similarly to $n_{1/2}^{\gamma}$). Similar definitions can be made for time based weights by replacing the indices i,j by time coordinates.

Figure 8:
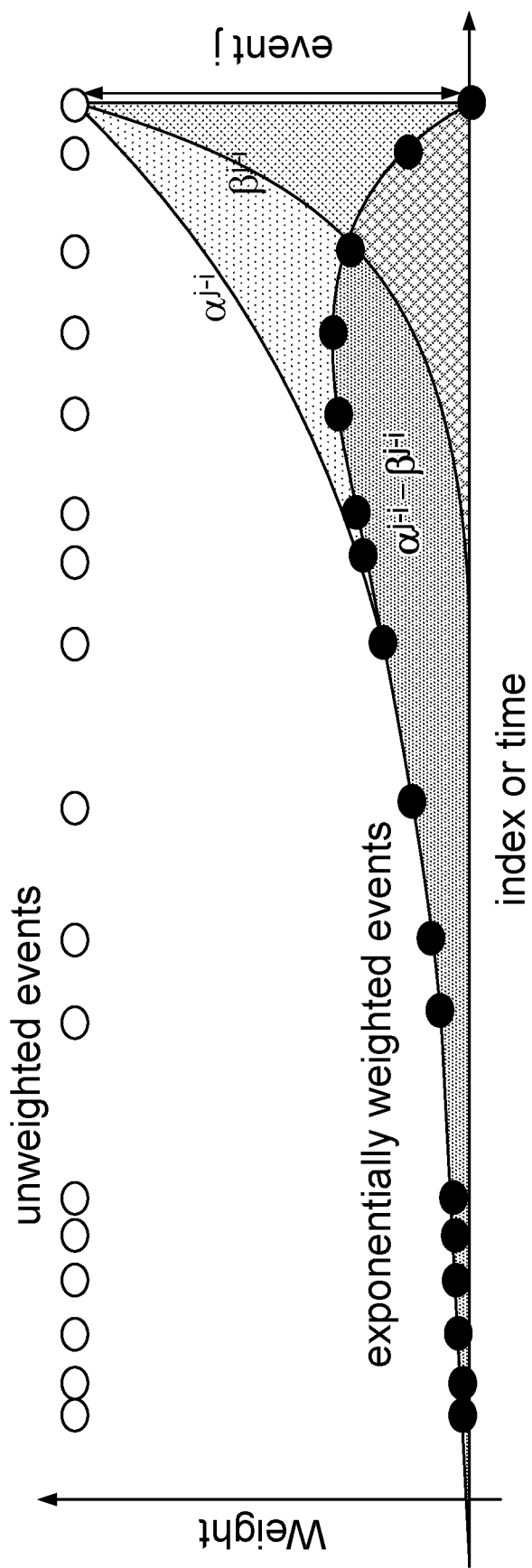
FIG. 8 shows an example of the effects of various exponential moving (EM) average weights.

FIG. 8 shows an example of the effects of various exponential moving (EM) average weights. In various embodiments, smoothing can be applied. For example, exponential moving average smoothing is applied on the calculated threshold to obtain a new threshold as described above. There are a variety of ways to apply a suppression factor to assign a lower weight to older events. The suppression factor can be time-based, if it is proportional to the time lag since the previous event, or index based-based, if it is constant. The suppression factor can also include a delay, as described above for the adaptive threshold, or it can be a suppression without delay. An example of a suppression without delay is when a count of all bins is decreased prior to incrementing a count of items in the identified percentile bin as described above.

The circles running across the top of the plot represent the unweighted events (here they are all weight 1). The exponentially weighted events shown in the plot represent the same events after the delayed EM weights are applied (dark shaded area). For comparison, the two non-delayed weights are ($\alpha^{j-i}$) and ($\beta^{j-i}$) as shown in FIG. 8. In various embodiments, delayed exponential moving average smoothing is applied to suppress effects of recent events. An example of this in FIG. 8 is the curve associated with $\alpha^{j-i}-\beta^{j-i}$, which gives lower weight to more recent events on the right side of the plot.

In various embodiments, when the monitoring value is larger than threshold $\tau_j^D$, an alarm is triggered. However, that is not necessarily the peak of the signal, where the anomalous behavior may be clearer. As described above, in various embodiments, a first alarm is triggered and accompanied by a flag indicating that the signal is still increasing. Later, an updated alarm at the peak (or in periodic intervals until the peak is attained) is triggered.

The adaptive threshold can be used to determine that a monitoring value meets or exceeds the threshold, in which case an explanation report is generated as follows.

Explanation reporting based on differentiation between items in different data groups is disclosed. A report includes a summary of events and features that explain changes in behavior (e.g., concept drift). The report can be generated based on the automatic model monitoring and adaptive threshold estimation techniques disclosed herein.

FIG. 9 is a flow chart illustrating an embodiment of a process for explanation reporting based on differentiation between items in different data groups. The process can be performed by a device such as node 1242.1 or 1242.2 of cluster 1240 (alone or in cooperation) or by a processor such as the one shown in FIG. 13.

The explanation reporting is an example of an indication associated with detecting that monitoring values meet a threshold (210 of FIG. 2) or can be performed in response to determining that one or more monitoring values meet a threshold. The explanation report provides information about the characteristics of the subset of events in the target T window that caused the alarm. In various embodiments, the explanation report can trigger automatic remedial measures or can be helpful for a user to analyze the alarm and take further action.

The process obtains model scores for an input dataset from a first machine learning model (900). The first machine learning model can be trained to take data as input and output a model score for each data record in at least a portion of an input dataset. An example is 202 of FIG. 2.

The process trains a second machine learning model to learn how to differentiate between two groups (902). The second machine learning model is a classification model that differentiates between two groups based on the features and/or model score present in each of the data records. The set of features can contain a subset containing raw fields of the data record and/or transformations of the raw fields. The model scores can be generated by the first machine learning model by processing events in a target T window and a reference R window using a measure of similarity/dissimilarity. Examples of target and reference windows are described above. The process ranks the T window events according to how likely they are to explain the alarm. In various embodiments, the model score, used in the computation to produce the monitoring value as described in FIG. 2, provides on its own an aggregated view of each event and is used to rank the T window events (without also needing to use features). Other features of the events may provide further useful information. In various embodiments, the process uses a machine learning model that considers both features and model scores.

For each alarm, the process creates a new target binary label with value 1 for events in T (the first group) and value 0 for events in R (the second group) and trains the second machine learning model to learn how to separate events in the two windows. An example of the second machine learning model is a Gradient Boosted Decision Trees (GBDT) model. The GBDT model allows the process to obtain an alarm score that can be used to rank events in T (e.g., a higher score is closer to the top). In addition, the GBDT model may be attractive because it directly provides a measure of feature importance that handles correlated features well. The latter provides a way of ranking the features themselves. In various embodiments, the number of trees of the GBDT model is fixed to 50, and the maximum depth of the trees is fixed to 5.

The process applies the second machine learning model to each data record in the data records in the first group to determine a corresponding ranking score for each data record in the data records in the first group (904). The ranking pushes to the top the events that are responsible for distorting the distribution of model scores in the target window. In various embodiments, removing events from the top of the list will suppress the signal to restore the signal to be below the threshold.

The process determines a relative contribution of each of the data records in the first group to the differentiation between the first group of data records and the second group of data records based on the corresponding ranking scores (906). The relative contribution is an explanation of a cause of the alarm. For example, an account, card, user, etc. associated with the data record may be malicious.

In various embodiments, pre-processing is performed prior to training the machine learning model (902). The pre-processing addresses the potential issue that, in a machine learning model approach, some features may be correlated with time or (similarly) with the index that defines the order of the events. Due to the sequential nature of the window configuration (T comes after R), those features will allow the model to very easily learn how to separate the T window events from the R windows events using that time information instead of learning the differences in the distributions of features between the two windows. To prevent this, a pre-processing process is applied in a burn in period to detect features that correlate with time. Those features are then excluded from the training of the machine learning model. An example of a pre-processing process is shown in FIG. 10.

FIG. 10 is a flow chart illustrating an embodiment of a process for removing time correlated features in a data set. The process can be performed as part of another process, for example prior to 902 of FIG. 9. The process can be performed during a burn in period to detect time-correlated features. The burn in period is a set of initial events in the data stream used for initialization. For example during the burn in period, windows are filled up so that the monitoring values and time-correlated features can be determined. Removing time- or index-correlated features results in a better input to the machine learning model to yield better explanations.

The process begins by obtaining a data series for a feature X associated with a distribution of values that generated the data records (1000). For example, consider a time series:

$$[(t_0,X_0), \ldots ,(t_i,X_i), \ldots ,(t_N,X_N)] \tag{5}$$

For streams of data with sizes above the thousands of instances, the time series for the feature values $X_i$ in the data records provides a good estimate of the distribution of values associated with the process responsible for generating the data.

The process shuffles the data series randomly a predetermined number of times (1002). The process generates values by shuffling the series randomly M times. The number of times to shuffle the series can be selected to ensure a high statistical confidence that a feature has a high correlation and should be excluded. For example, the process generates around 60 values as further explained below.

The process calculates the corresponding values of a measure of correlation for each shuffle (1004). Whether there is a correlation between an ordered set of timestamps (or index values) $T=[t_0, \ldots, t_i, \ldots, t_N]$ and the feature values $X=[X_0, \ldots, X_i, \ldots, X_N]$ can be determined by using a measure of correlation that is sensitive to non-linear relations. One such measure of correlation is a Maximal Information Coefficient (MIC), which is bounded in the interval [0, 1] where MIC=1 corresponds to a perfect correlation.

The number M of samples of MIC needed to observe under $H_0$ (null hypothesis that the feature X is not time correlated), so that at least one of the MIC values is as large as $MIC_\alpha$ with probability at least p, is given by:

$$P(\max(MIC_1, \ldots, MIC_M) \geq MIC_\alpha) = 1-(1-\alpha)^M \geq p \quad (6)$$

where $$\geq \frac{\log(1-p)}{\log(1-\alpha)}.$$

For simplicity, set $p=1-\alpha$. If $\alpha=0.05$, then M on the order of 60 gives a 95% probability to obtain one MIC value (or more) in the 5% upper tail of the distribution.

The process selects a maximum observed value among the shuffles to be a threshold (1006). The maximum observed value in the M shufflings serves as a threshold for the feature X, given X and T and $MIC(X, T) \neq 0$. As further described below, the threshold will be used to determine whether to remove features.

The process determines a value for the measure of correlation without shuffling (1008). Continuing with the example of Maximal Information Coefficient (MIC), the process determines the MIC value of the data series of a feature $X=[X_0, \ldots, X_i, \ldots, X_N]$ without shuffling the data series.

The process removes a feature if the value for the measure of correlation without shuffling of the feature is larger than the threshold (1010). In other words, the process compares the value obtained at 1008 with the threshold obtained at 1006. A feature is removed if MIC(X) is larger than the determined threshold.

FIG. 11 shows an example of an explanation report according to an embodiment of the present disclosure. The explanation report (called an alarm report here) is generated using the process of FIG. 9.

In various embodiments, the explanation report includes one or more of the following sections:
  Windows information with start and end timestamps for each window (1102),
  A feature importance ranking list (which can be truncated, e.g., top 10) (1104),
  Validation curve to observe how well the ranking can lower the signal (1106),
  A table of the top N (e.g., 100) events that explain the alarm. The table contains the feature values used by the machine learning model (with columns ordered from left to right according to the feature importance ranking). This may contain some extra fields selected according to domain knowledge (e.g., emails, addresses, etc.) (1108).

The validation graph (1106) shows the robustness of the ranking provided by the machine learning model and can be generated as follows. Since the goal of the ranking is to push to the top the events that are responsible for distorting the distribution of model scores in the target window, removing events from the top of the list is expected to suppress the signal. Therefore, in the validation curve each point is the value of the signal using R as reference, but T with the top k events removed. For comparison, a curve is defined where, for each point, k events are randomly removed from T The drift score curve is not expected to lower the monitoring value if the alarm is a false positive. In that case the drift score curve (removal by drift score) should be similar or above the random curve.

Automatic model monitoring systems implemented using the techniques disclosed have yielded experimental results where new anomalies were detected compared to a conventional system with only a supervised machine learning model scoring component. Aggregating events and processing them using the disclosed techniques allow more anomalies to be detected including those that conventional systems are unable to detect. In one instance, an automatic model monitoring system was evaluated in five real world fraud detection datasets, each spanning periods up to eight months and totaling more than 22 million online transactions. The system generated around 100 reports, and domain experts reported that those reports are useful and that the system was able to detect anomalous events in a model life cycle. Labels are not needed in order to detect concept drift when using the techniques disclosed.

FIG. 12 is a block diagram illustrating an embodiment of a system in which automatic model monitoring for data streams can be implemented. The system includes one or more nodes in a cluster 1240 that perform automatic model monitoring. The environment includes one or more transaction devices 1202, 1204, 1206, gateway 1210, network 1220, issuer 1230, and a cluster 1240 made up of one or more nodes 1242.1, 1242.2. Transaction devices 1202-1206 collect transaction data, and transmit the transaction data via gateway 1210 to issuer 1230. Issuer 1230 verifies the transaction data to determine whether to approve the transaction. For example, processing a transaction involving a purchase includes receiving account information (e.g., credit/debit) and transaction details (e.g., purchase amount) at a transaction device and determining whether to approve the transaction. An approved transaction may mean that payment by the account is accepted in exchange for goods or services. A denied transaction may mean that payment by the account is denied.

In some embodiments, whether to approve or deny a transaction can be based on an assessment of the likelihood that the transaction is fraudulent by monitoring data streams using the techniques disclosed herein. In some embodiments, cluster 1240 is configured to perform the techniques disclosed herein to detect anomalies and provide an indication (such as an alarm report) to issuer 1230 or a third party such as a merchant.

By way of non-limiting example, transaction data may include one or more of: time of transaction, account/payment information (such as a credit card account number, a debit account number, or a bank account wire number), amount paid, currency, transaction location, merchant name, merchant address, category code, city, state, zip, country, terminal identification, authentication type, and the like. In some embodiments, account data is generated by the transaction device by processing/filtering the account information. For example, an account number can be encrypted/hashed to protect the account number. A transaction device may be implemented by a terminal, a point of sale (POS) device, or any other device that accepts account information. For example, a terminal includes a credit card terminal that processes payment based on a received credit card account number. The transaction device may receive and parse account information using a variety of electronic techniques such as a chip reader, a magnetic stripe reader, barcode scanner, etc. In some embodiments, a transaction device is associated with a location and may be identified by its associated location. For example, a brick and mortar retailer (BM) having three checkout terminals (12-3) each equipped with one of the transaction devices 1202-1206 may be identified by transaction devices BM12, BM2, and BM3. As another example, a transaction device is a website processing payment for goods and services purchased over the Internet.

A transaction location, which is typically associated with a transaction device, is a location where account information can be received to initiate a transaction. A transaction location may be a physical/geographical location, a location of a terminal, a Web location, and the like. Examples of transaction locations include checkout terminals, stores, a group of stores, or a system-wide (e.g., entire E-commerce merchant) location, and the like.

Misappropriated information (e.g., payment information) may be presented to a transaction device 1202-1206 for a purchase. If misappropriated information is used, then the transaction is fraudulent. During a transaction approval process or shortly after the transaction takes place, automatic model monitoring can be performed to identify and explain anomalous behavior. This signals that a transaction is potentially fraudulent. If applied during the transaction, a potentially fraudulent transaction may be prevented by declining the proffered payment method. If applied shortly after the transaction, the transaction may be reviewed and dis-approved or the payment method may be declined for subsequent transactions. This avoids future exploits of the payment method. Automatic model monitoring may also be used after a decision to review, approve, or decline a transactions as well as to detect and explain anomalous behavior related to other issues such as system problems or unusual flows of transactions into the system.

A transaction identified to be a potentially fraudulent transaction can trigger remedial action such as verifying with an issuer bank or with the card holder whether the card was used without authorization. If so, then the potentially fraudulent transaction is confirmed to be actually fraudulent. The determination of potentially fraudulent transactions may be used to block a payment type associated with the potentially fraudulent transaction from being used in the future. An anticipated transaction (e.g., future location or time) can be determined/predicted, and preempted by declining the payment type.

Gateway 1210 receives transaction data from one or more transaction devices 1202-1206, routes the transaction data to network 1220, and returns an approval or decline notice based on the approval process of network 1220. Gateway 1210 may include a payment acquirer or Internet Service Provider. For example, the payment acquirer may be software hosted on a third-party server that handles transmissions between a merchant (represented by transaction devices 1202-1206) and an issuer 1230. In some embodiments, a gateway is associated with an acquiring bank (also referred to as a merchant bank). The acquiring bank is registered with a network 1220, wherein the network represents a card association or card scheme (e.g., Visa®, MasterCard®, American Express®, etc.). The acquiring bank contracts with merchants to create and maintain accounts allowing the merchant to accept accounts such as credit and debit cards. In some embodiments, gateway 1210 processes and encrypts the transaction data before routing the transaction data. In some embodiments, gateway 1210 groups one or more transactions together and sends the batch of transactions to issuer 1230 via network 1220.

Network 1220 is a platform for transmitting data between devices to support payment processing and electronic payments. In some embodiments, network 1220 is associated with a credit card association or card scheme (e.g., Visa®, MasterCard®, American Express®, etc.) and supports communications between association members such as an acquiring bank (e.g., gateway 1210) and an issuing bank (e.g., issuer 1230). In some embodiments, network 1220 implements a clearing house to provide clearing and settlement services. Network 1220 determines an appropriate destination to route the transaction data. For example, several issuer banks may be members of the network. The network determines the issuer corresponding to the transaction data and routes the transaction to the appropriate issuer. For simplicity, only one issuer 1230 is shown in FIG. 12. In some embodiments, network 1220 filters the received transaction data. For example, network 1220 may be aware of fraudulent accounts and determine whether the received transaction data includes a fraudulent account. Network 1220 may include one or more network connected servers for processing, routing, and/or facilitating transactions.

Issuer 1230 receives transaction data from network 1220 and determines whether to approve or deny a transaction (e.g., a provided account/payment). For example, issuer 1230 includes one or more servers/systems of an issuing bank. In some embodiments, the issuer is associated with an acquiring bank via network 1220. In some embodiments, determining whether to approve or deny an account/payment method includes determining whether the transaction is potentially fraudulent.

Automatic model monitoring is useful for, among other things, detecting anomalies in a data stream. The automatic model monitoring includes generating an explanation report, which can be used for a variety of purposes including but not limiting to informing an administrator of a potential system issue, providing analytics to a data scientist, and determining whether to allow or deny a transaction. A transaction attempted to be performed by an account identified as likely compromised is denied. As another example, transaction authorization is handled as follows. Previously identified fraudulent transactions are stored in storage 1244. When performing transaction authorization based on received transaction information, issuer 1230 accesses storage 1244 to determine whether the received transaction information is associated with a transaction device/location previously identified as a potentially fraudulent transaction stored in storage 1244. For example, if the transaction information is similar to a previously-identified potentially fraudulent transaction, the issuer denies the transaction.

Storage 1244 stores information about transactions. Storage 1244 can be implemented by or include a variety of storage devices including devices for a memory hierarchy (cache, RAM, ROM, disk). In some embodiments, storage 1244 stores a list of potentially fraudulent transactions and/or a list of stolen/fraudulent accounts. The transaction information can be provided as a single transaction or a list of transactions. In some embodiments, a list of (past) transactions is stored in storage 1244 for a predetermined time, and is used to analyze subsequently-received transactions to provide output.

A payment verification process may take place within the environment shown in FIG. 12. In operation, a transaction device (1202, 1204, and/or 1206) receives transaction information such as account, time, amount, etc. as further described herein. In some embodiments, the transaction device processes the transaction information (e.g., packages the data). The transaction device sends the transaction data to gateway 1210. Gateway 1210 routes the received transaction data to network 1220. Network 1220 determines an issuer based on the transaction data, and sends the transaction data to the issuer. Issuer 1230 determines whether to approve or deny the transaction and detects system problems or unusual flows of transactions based on the transaction data and a security process performed by one or more nodes 1242.1, 1242.2. One or more nodes 1242.1, 1242.2 performs security processes to analyze the received transaction data and identify anomalies. The processes shown in FIGS. 2, 5, 9 are examples of security processes performed by cluster 1240.

Network 1220 and gateway 1210 relay an approval or decline notice back to the transaction device. If the transaction is approved, payment has been accepted and the transaction is successful. If the transaction is declined, payment has not been accepted and the transaction is declined.

In some embodiments, nodes of cluster 1240 are controlled and managed by issuer 1230. For example, devices/systems of the issuer or payment processing network retain transaction information and perform analysis to identify potentially fraudulent transactions. For example, the one or more nodes may be provided within the computing environment of issuer 1230. In some embodiments, nodes of cluster 1240 are controlled and managed by a third party. For example, issuer 1230 has contracted with the third party to perform analysis using data provided to the issuer (e.g., transaction information) to identify for the issuer likely potentially fraudulent transactions. One or more nodes of cluster 1240 perform the processes described herein, e.g., the processes shown in FIGS. 2, 5, 6, 9, 10.

Figure 13:
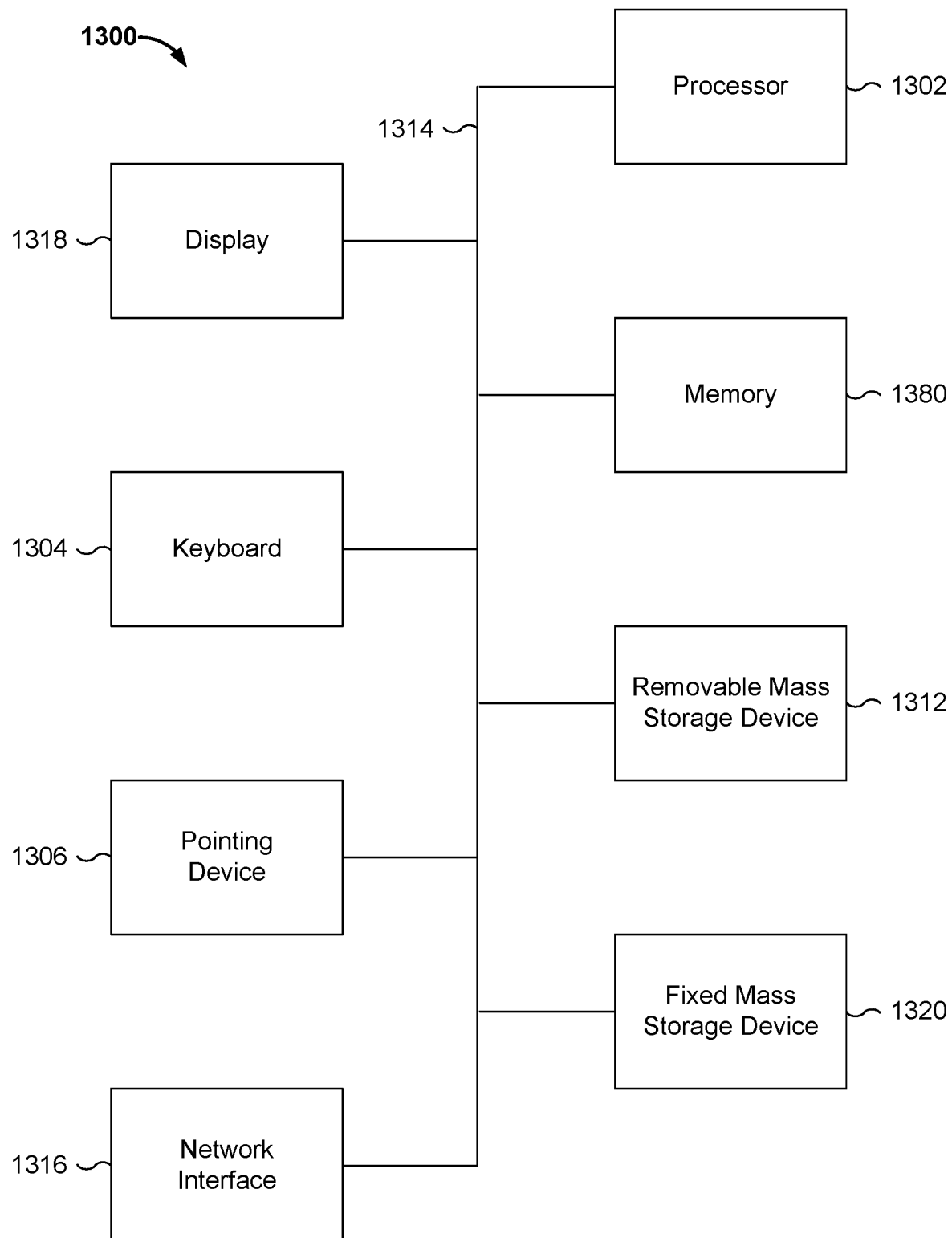
FIG. 13 is a functional diagram illustrating a programmed computer system for automatic model monitoring in accordance with some embodiments.

FIG. 13 is a functional diagram illustrating a programmed computer system for automatic model monitoring in accordance with some embodiments. As will be apparent, other computer system architectures and configurations can be used to perform automatic model monitoring. Computer system 1300, which includes various subsystems as described below, includes at least one microprocessor subsystem (also referred to as a processor or a central processing unit (CPU)) 1302. For example, processor 1302 can be implemented by a single-chip processor or by multiple processors. In some embodiments, processor 1302 is a general purpose digital processor that controls the operation of the computer system 1300. Using instructions retrieved from memory 1380, the processor 1302 controls the reception and manipulation of input data, and the output and display of data on output devices (e.g., display 1318). In some embodiments, processor 1302 includes and/or is used to provide nodes 142.1 or 142.2 or cluster 140 in FIG. 1 and/or executes/performs the processes described above with respect to FIGS. 2, 5, 6, 9, 10.

Processor 1302 is coupled bi-directionally with memory 1380, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1302. Also as is well known in the art, primary storage typically includes basic operating instructions, program code, data, and objects used by the processor 1302 to perform its functions (e.g., programmed instructions). For example, memory 1380 can include any suitable computer-readable storage media, described below, depending on whether, for example, data access needs to be bi-directional or uni-directional. For example, processor 1302 can also directly and very rapidly retrieve and store frequently needed data in a cache memory (not shown).

A removable mass storage device 1312 provides additional data storage capacity for the computer system 1300, and is coupled either bi-directionally (read/write) or uni-directionally (read only) to processor 1302. For example, storage 1312 can also include computer-readable media such as magnetic tape, flash memory, PC-CARDS, portable mass storage devices, holographic storage devices, and other storage devices. A fixed mass storage 1320 can also, for example, provide additional data storage capacity. The most common example of mass storage 1320 is a hard disk drive. Mass storage 1312, 1320 generally store additional programming instructions, data, and the like that typically are not in active use by the processor 1302. It will be appreciated that the information retained within mass storage 1312 and 1320 can be incorporated, if needed, in standard fashion as part of memory 1380 (e.g., RAM) as virtual memory.

In addition to providing processor 1302 access to storage subsystems, bus 1314 can also be used to provide access to other subsystems and devices. As shown, these can include a display monitor 1318, a network interface 1316, a keyboard 1304, and a pointing device 1306, as well as an auxiliary input/output device interface, a sound card, speakers, and other subsystems as needed. For example, the pointing device 1306 can be a mouse, stylus, track ball, or tablet, and is useful for interacting with a graphical user interface.

The network interface 1316 allows processor 1302 to be coupled to another computer, computer network, or telecommunications network using a network connection as shown. For example, through the network interface 1316, the processor 1302 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1302 can be used to connect the computer system 1300 to an external network and transfer data according to standard protocols. For example, various process embodiments disclosed herein can be executed on processor 1302, or can be performed across a network such as the Internet, intranet networks, or local area networks, in conjunction with a remote processor that shares a portion of the processing. Additional mass storage devices (not shown) can also be connected to processor 1302 through network interface 1316.

An auxiliary I/O device interface (not shown) can be used in conjunction with computer system 1300. The auxiliary I/O device interface can include general and customized interfaces that allow the processor 1302 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 13 is but an example of a computer system suitable for use with the various embodiments disclosed herein. Other computer systems suitable for such use can include additional or fewer subsystems. In addition, bus 1314 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving an input dataset;
   using a machine learning model to determine a model score for each data record of at least a portion of the input dataset;
   determining monitoring values including by summing individual divergence contributions for each bin of a group of bins, wherein each monitoring value of at least a portion of the determined monitoring values is associated with a measure of similarity comparing (i) a histogram of model scores for those data records of the input dataset within a corresponding moving reference window and (ii) a histogram of model scores for those data records of the input dataset within a corresponding moving target window; and
   outputting the determined monitoring values.

2. The method of claim 1, wherein the input dataset includes at least one of: events received in real time and a stream of data records.

3. The method of claim 1, wherein the measure of similarity includes Jensen-Shannon divergence.

4. The method of claim 1, wherein at least one of the target window and the reference window is a fixed size.

5. The method of claim 1, wherein the size of the target window is based at least in part on an average number of events in a pre-defined period.

6. The method of claim 1, wherein the size of the reference window is a multiple of the size of the target window.

7. The method of claim 1, wherein at least one of the target window and the reference window is time-based.

8. The method of claim 1, wherein the target window captures more recent events in the input dataset than events captured by the reference window.

9. The method of claim 1, wherein the reference window and the target window are contiguous.

10. The method of claim 1, wherein determining monitoring values includes using a plurality of homologous reference windows with the same time-based or index-based size that are regularly spaced.

11. The method of claim 1, wherein outputting the determined monitoring values includes rendering the monitoring values on a graphical user interface.

12. The method of claim 1, further comprising:
    detecting that at least one of the monitoring values meets a threshold; and
    in response to the detection that at least one of the monitoring values meets the threshold, providing an indication associated with the detection.

13. The method of claim 12, wherein detecting that at least one of the monitoring values meets a threshold indicates concept drift.

14. The method of claim 12, wherein detecting that at least one of the monitoring values meets a threshold indicates a fraud attack.

15. A method, comprising:
    receiving an input dataset;
    using a machine learning model to determine a model score for each data record of at least a portion of the input dataset;
    determining monitoring values, wherein each monitoring value of at least a portion of the determined monitoring values is associated with a measure of similarity comparing (i) a histogram of model scores for those data records of the input dataset within a corresponding moving reference window and (ii) a histogram of model scores for those data records of the input dataset within a corresponding moving target window;
    outputting the determined monitoring values;
    detecting that at least one of the monitoring values meets a threshold;
    in response to the detection that at least one of the monitoring values meets the threshold, providing an indication associated with the detection; and
    in response to detecting that at least one of the monitoring values meets the threshold, freezing a time location of the reference window and sliding the target window until at least one of the monitoring values falls below the threshold.

16. The method of claim 12, further comprising updating the machine learning model in response to detecting that at least one of the monitoring values meets the threshold.

17. The method of claim 12, wherein detecting that at least one of the monitoring values meets a threshold is made prior to labels becoming available.

18. A system comprising:
    a processor configured to:
      receive an input dataset;
      use a machine learning model to determine a model score for each data record of at least a portion of the input dataset;
      determine monitoring values including by summing individual divergence contributions for each bin of a group of bins, wherein each monitoring value of at least a portion of the determined monitoring values is associated with a measure of similarity comparing (i) a histogram of model scores for those data records of the input dataset within a corresponding moving reference window and (ii) a histogram of model scores for those data records of the input dataset within a corresponding moving target window; and a memory coupled to the processor and configured to provide the processor with instructions.

19. A computer program product embodied in a non-transitory computer readable storage medium and comprising computer instructions for:

receiving an input dataset;

using a machine learning model to determine a model score for each data record of at least a portion of the input dataset;

determining monitoring values including by summing individual divergence contributions for each bin of a group of bins, wherein each monitoring value of at least a portion of the determined monitoring values is associated with a measure of similarity comparing (i) a histogram of model scores for those data records of the input dataset within a corresponding moving reference window and (ii) a histogram of model scores for those data records of the input dataset within a corresponding moving target window; and outputting the determined monitoring values.

* * * * *